(12) United States Patent
Kim et al.

(10) Patent No.: US 11,465,049 B2
(45) Date of Patent: Oct. 11, 2022

(54) METHOD FOR ADVERTISING THROUGH PLAYING CARD GAME AND SYSTEM THEREFOR

(71) Applicants: Beoung Cheon Kim, Seongnam-si (KR); Bae Rim Kim, Seoul (KR)

(72) Inventors: Beoung Cheon Kim, Seongnam-si (KR); Bae Rim Kim, Seoul (KR)

(*) Notice: Subject to any disclaimer, the term of this patent is extended or adjusted under 35 U.S.C. 154(b) by 42 days.

(21) Appl. No.: 16/963,214

(22) PCT Filed: Jan. 17, 2019

(86) PCT No.: PCT/KR2019/000677
§ 371 (c)(1),
(2) Date: Jul. 18, 2020

(87) PCT Pub. No.: WO2019/143138
PCT Pub. Date: Jul. 25, 2019

(65) Prior Publication Data
US 2021/0129030 A1 May 6, 2021

(30) Foreign Application Priority Data
Jan. 19, 2018 (KR) .................. 10-2018-0006974

(51) Int. Cl.
*A63F 13/61* (2014.01)
*A63F 13/46* (2014.01)
*A63F 13/80* (2014.01)

(52) U.S. Cl.
CPC ............. *A63F 13/61* (2014.09); *A63F 13/46* (2014.09); *A63F 13/80* (2014.09)

(58) Field of Classification Search
CPC ........... A63F 13/61; A63F 13/46; A63F 13/80
See application file for complete search history.

(56) References Cited

U.S. PATENT DOCUMENTS

| | | | | |
|---|---|---|---|---|
| 2002/0183105 | A1* | 12/2002 | Cannon | G07F 17/3267 463/16 |
| 2006/0058092 | A1* | 3/2006 | Crawford, III | G07F 17/3293 463/13 |
| 2006/0063587 | A1* | 3/2006 | Manzo | G07F 17/3227 463/25 |

FOREIGN PATENT DOCUMENTS

| | | |
|---|---|---|
| KR | 10-0434781 B1 | 6/2004 |
| KR | 10-2006-0088703 A | 8/2006 |

(Continued)

OTHER PUBLICATIONS

Pagat.com rules of card game Gostop, archived 2016 (Year: 2016).*

*Primary Examiner* — Thomas H Henry
(74) *Attorney, Agent, or Firm* — KORUS Patent, LLC; Seong Il Jeong

(57) ABSTRACT

The present invention relates to an advertising method and system that when a service of a card game is provided to member customers online by using a deck of playing cards in which an advertisement is converted into a story, provide an inseparable relationship between a game and an advertisement, thereby allowing players participating in the game to enjoy the advertisement contained in the playing cards together with the game in an amusing and interesting manner. According to an embodiment of the present invention, there is provided a system for advertising through a playing card game, in which a plurality of player terminals connects with a game server over a network and plays a game using a deck of playing cards (hereinafter "cards") created by converting an advertisement into a story.

14 Claims, 23 Drawing Sheets

(56) References Cited

FOREIGN PATENT DOCUMENTS

| KR | 10-2009-0001826 A | 1/2009 |
|----|-------------------|--------|
| KR | 10-2011-0125388 A | 11/2011 |
| KR | 10-2012-0040590 A | 4/2012 |
| KR | 10-1626440 B1 | 6/2016 |

* cited by examiner

[SCORING UPON COMPLETION OF ROW(S)]   PLAYING CARD: PLAYING CARDS ARRANGED ON A CARD ARRANGEMENT BOARD

| PLAYER A ENTRY COUPON ACCOUNT | | | | | |
|---|---|---|---|---|---|
| DATE OF ISSUE | CAUSE OF ISSUE | ISSUE NO. | WINNING RESULTS | WINNING PRIZE MONEY AMOUNT | WINNING PRIZE MONEY RECEIVED OR NOT |
| 2018-07-07 14:15:02 | COMPLETION OF AN ADVERTISING STORY | 2810489 | IN PROGRESS | | |
| 2018-07-06 13:23:45 | COMPLETION OF AN ADVERTISING STORY | 2765420 | IN PROGRESS | | |
| 2018-07-03 23:21:25 | WINNING OF A GAME | 2557894 | IN PROGRESS | | |
| 2018-06-30 20:56:23 | WINNING OF A GAME | 2546541 | END | | |
| 2018-06-29 19:15:52 | WINNING OF A GAME | 2456789 | END | | |
| 2018-06-28 22:56:36 | WINNING OF A GAME | 2413256 | WINNING | 7,000,000 | NO WINNING PRIZE MONEY RECEIVED |
| 2018-06-25 23:12:21 | COMPLETION OF AN ADVERTISING STORY | 2345678 | END | | |
| 2018-06-23 13:45:54 | COMPLETION OF AN ADVERTISING STORY | 2245678 | END | | |
| 2018-06-24 16:34:43 | WINNING OF A GAME | 2136450 | END | | |
| PREVIOUS / NEXT | | | | | |

FIG. 23

METHOD FOR ADVERTISING THROUGH PLAYING CARD GAME AND SYSTEM THEREFOR

TECHNICAL FIELD

The present invention relates to a method for advertising through playing card game and a system therefor, and more particularly to an advertising method and system that when a service of a card game is provided to member customers online by using a deck of playing cards in which an advertisement is converted into a story, provide an inseparable relationship between a game and an advertisement, thereby allowing players participating in the game to enjoy the advertisement contained in the playing cards together with the game in an amusing and interesting manner.

BACKGROUND ART

Currently, online spaces have become universal activity areas of people along with offline spaces. More various types of activities are conducted in online spaces than in offline spaces in that online spaces are not limited by time and space. This trend will be further accelerated by technological advances.

Despite the rapid development of online spaces, various types of problems are being produced in various fields, such as gambling, illegal video, hacking, etc. In particular, playing card games such as hwatu and poker, which are the objects of the present invention, have a problem in that they are regarded as being national games that are enjoyed by old and young men and women and stigmatized as being gambling games that can only be used by those over the age of 19.

As an actual example, playing card games such as hwatu and poker are used literally as gambling in which in illegitimate gambling websites, money is bet and won from other people. Although it seems that in legitimate websites, entertainment games are played in such a manner that game money is purchased and exchanged between individuals through the games, the controversy over the gambling property of these games is still in progress in that game money is cashed through external currency exchangers and is actually used for gambling.

To mitigate this problem, the government is strictly prohibiting illegitimate websites by means of laws. In the case of legitimate websites, the government is taking strict legal measures to prevent playing card games from being used for gambling by making laws regulating playing card games, thereby prohibiting the purchase of game money per person from exceeding 500,000 won per month, setting the limit of game money per round and then prohibiting game money from exceeding the limit, and prohibiting a member having a specific amount of game money or larger from choosing a specific game room so that he or she cannot sell game money.

Nevertheless, illegitimate gambling sites are overflowing online. Even in the case of legitimate websites, 500,000 won per month set for entertainment by the government is not a small amount of money. In addition, such games are still problematic not only online but also offline, as long as the human desire to feel bliss and seize the opportunity through gambling does not disappear.

Therefore, in order to solve the above problem, the playing card game used as a popular game must escape from the current gambling issue and evolve into a new form of game having a more sound and interesting composition.

Meanwhile, online advertisements are provided to members (customers) through display advertisements or video advertisements, including unique keyword advertisements that can only be provided online. Keyword advertisements are limited to only a few members (customers) who use specific products and services using search terms. Other advertisements are flooded online like floods, and thus have problems in that they have reluctance and indifference to the advertisements and it is not easy to attract the attention of the eyes and ears of members (customers) due to the spatial limitations of web pages.

In order to overcome these problems, various types of advertisements have been recently provided using games enjoyed by a large number of people. This scheme also causes a problem in that an advertisement distracts concentration on a corresponding game. In the case where a corresponding advertisement lacks the association with a game, a problem arises in that it is difficult to achieve a high advertising effect even when the corresponding advertisement is exposed.

DISCLOSURE

Technical Problem

The present invention has been conceived to overcome the above-described problems, and an object of the present invention is to provide a method for advertising through a playing card game and a system therefor, which provide a card game to customers by using a deck of playing cards in which an advertisement is converted into a story, and thus the game and the advertisement are integrated with each other, thereby allowing a player participating in the game to recognize the advertisement as well as the game in an amusing and interesting fashion.

Furthermore, an object of the present invention is to provide a method for advertising through a playing card game and a system therefor, which provide a playing card game based on a scoring comparison method of determining a winner by comparing scores acquired in the game rather than a gambling game method of exchanging game money, thereby ensuring the soundness and performance of the game while overcoming a conventional problem in which a playing card game is regarded as a gambling game in which game money is exchanged.

Furthermore, an object of the present invention is to provide a method for advertising through a playing card game and a system therefor, which when a player participating in the game arranges playing cards on a card arrangement board through the game, allow an advertising story contained in the playing cards to be clearly revealed on the card arrangement board.

Furthermore, an object of the present invention is to provide a method for advertising through a playing card game and a system therefor, which issue an entry coupon whenever a player participating in a game completes an advertising story on his or her card arrangement board and pay prize money, generated by advertising sales, through drawing, thereby not only boosting the popularity of the game but also significantly increasing attention to the advertising story.

Furthermore, an object of the present invention is to provide a method for advertising through a playing card game and a system therefor, which issue an entry coupon whenever a player participating in a game wins and pay prize money, generated by advertising sales, through drawing, thereby not only boosting the popularity of the game but also significantly increasing intimacy with a company that provides the advertisement.

Furthermore, an object of the present invention is to provide a method for advertising through a playing card game and a system therefor, which expose an advertisement from the start of a game to the end thereof, thereby allowing the advertisement to be inculcated in a player who participates in the game.

Furthermore, an object of the present invention is to provide a method for advertising through a playing card game and a system therefor, which add a product advertisement associated with a storytelling advertisement that allows a corporate brand to be recognized using a card arrangement board on one side of a game window, thereby further improving the completeness of the advertisements.

Moreover, an object of the present invention is to provide a method for advertising through a playing card game and a system therefor, which whenever a member (customer) participates in a game, a varying advertising story is provided through playing cards, thereby providing variety to the game but also considerably increasing curiosity and interest in the advertisement.

Technical Solution

In order to accomplish the above objects, according to an embodiment of the present invention, there is provided a system for advertising through a playing card game, in which a plurality of player terminals connects with a game server over a network and plays a game using a deck of playing cards (hereinafter "cards") created by converting an advertisement into a story, wherein:

the game server outputs a game progress screen including a card arrangement board to each of the plurality of player terminals, and deals out the cards as a plurality of player cards (cards held by players), table cards (table face-up cards), and table standby cards (table face-down cards);

when a player proceeds with a game and acquires a table face-up card, the game server moves and arranges the acquired card to and on a card arrangement board of the corresponding player and awards a score according to a combination of cards; and when the combination of the cards is changed during the game, the game server automatically changes the score and provides the changed score to the player terminal.

Furthermore, the plurality of player terminals is first and second player terminals, and the plurality of player cards is first and second player cards.

Furthermore, the card arrangement board is configured to be arranged in the same configuration as the cards used in the game, is provided to each player, and allows cards acquired by each player during a game process to be arranged thereon.

Furthermore, the card arrangement board serves as criteria for allowing different scores to be awarded according to a combination of arranged cards, and clearly reveals the advertising story contained in the cards.

Furthermore, the game progress screen is configured such that player cards (cards held by players, table cards (table face-up cards), and table standby cards (table face-down cards) are located on a center portion thereof, card arrangement boards for respective players are located on a left side thereof, and product advertisement windows for respective players and a chat window are located on a right side thereof.

Furthermore, the game server outputs a storytelling advertisement contained in playing cards when each player arranges the playing cards on his or her card arrangement board, and outputs a product advertisement associated with a corresponding storytelling advertisement onto a corresponding player-based product advertisement window of the game progress screen.

Furthermore, the playing cards are marked with numbers in order to indicate differences in sequence, four cards are allocated to each of the numbers, and the four cards are marked with patterns in order to indicate differences among them.

Furthermore, numbers and patterns are marked on upper or lower portions of first sides of the cards in small sizes, and characters or images adapted to convert an advertisement into a story are marked on center portions of the cards in sizes larger than those of the numbers and the patterns.

Moreover, the game server issues an entry coupon to a player who completes an advertising story using acquired cards on the card arrangement board or a player who has more cumulative scores at an end of the game, and pays prize money through drawing.

According to an embodiment of the present invention, there is provided a method for advertising through a playing card game, in which first and second player terminals connect with a game server over a network and play a game using a deck of playing cards (hereinafter "cards") created by converting an advertisement into a story, the method comprising:

(a) outputting, by a game server, a game progress screen including a card arrangement board to each of first and second player terminals;

(b) dealing out, by the game server, the cards as cards held by first and second players, table face-up cards, and table face-down cards and providing, by the game server, the cards held by first and second players to first and second player terminals;

(c) when any one of the first and second player terminals proceeds with a game and acquires a table face-up card, moving and arranging the acquired card to and on a card arrangement board of the corresponding player terminal;

(d) awarding a score according to a combination of cards arranged on the card arrangement board;

(e) when the combination of the cards is changed, adding or deducting a score to or from a current score;

(f) awarding a score for one round game to each of the first and second player terminals by repeating steps (c) to (e) until the player cards are exhausted;

(g) accumulating scores for an overall game by repeating steps (a) to (f) up to a final round game; and (h) determining a player having the larger cumulative score to be a winner.

Furthermore, the game server configures the card arrangement board so that the card arrangement board is arranged in a same configuration as the cards used in the game, provides the card arrangement board to each player, and allows cards acquired by each player during a game process to be arranged thereon.

Moreover, the game server locates player cards (cards held by players, table cards (table face-up cards) and table standby cards (table face-down cards) on a center portion of the game progress screen, locates card arrangement boards for respective players on a left side thereof, and locates product advertisement windows for respective players and a chat window on a right side thereof.

Furthermore, the game server outputs a storytelling advertisement contained in playing cards when each player arranges the playing cards on his or her card arrangement board; and the game server outputs a product advertisement associated with a corresponding storytelling advertisement onto a corresponding player-based product advertisement window of the game progress screen.

Furthermore, the game server configures the card arrangement board so that each column includes 4 spaces, and awards scores in an arithmetical manner whenever a column is completed in such a manner that 1 point per card is awarded when only one column is not completed, 2 points per card are awarded when one column is completed, 3 points per card are awarded when two columns are successively completed, and so forth.

Furthermore, the game server configures the card arrangement board so that each row includes a plurality of spaces to complete an advertising story, and awards scores in a geometrical manner whenever a row is completed in such a manner that a score twice the vertical score is awarded when one overall row is completed, a score four times the vertical score is awarded when two overall rows are completed (regardless of successive completion), and so forth.

Furthermore, the game server issues an entry coupon to a corresponding player terminal whenever a player completes one overall row of the card arrangement board, and issues an entry coupon to a terminal of a player determined to be a winner.

Furthermore, the game server draws one from entry coupons and pays prize money to a prize winner, and the prize money is prepared by accumulating a predetermined percentage of advertisement sales generated during the game.

Moreover, the game server invests the player with a right to take one card from the cards arranged on the opponent player card arrangement board when the player performs a chok, a sseul, a ttadak, a hand-poktan, or a table-poktan during the game, and moves and arranges one selected specific card on the player card arrangement board of the corresponding player when the player selects (clicks) the specific card on a corresponding player terminal.

Advantageous Effects

According to the above-described technical solution, a card game is provided using a deck of playing cards in which an advertisement is converted into a story, and thus the game and the advertisement are integrated with each other, thereby allowing a player participating in the game to recognize the advertisement as well as the game in an amusing and interesting fashion.

Furthermore, when a player participating in the game arranges playing cards on a card arrangement board through the game, an advertising story contained in the playing cards may be clearly revealed on the card arrangement board.

Furthermore, an entry coupon is issued whenever a player participating in a game completes an advertising story on his or her card arrangement board and prize money generated by advertising sales is paid through drawing, thereby not only boosting the popularity of the game but also significantly increasing attention to the advertising story.

Furthermore, an entry coupon is issued whenever a player participating in a game wins and prize money generated by advertising sales is paid through drawing, thereby not only boosting the popularity of the game but also significantly increasing intimacy with a company that provides the advertisement.

Furthermore, an advertisement is always exposed from the start of a game to the end thereof, thereby allowing the advertisement to be inculcated in a player who participates in the game.

Furthermore, a product advertisement associated with a storytelling advertisement is output onto the card arrangement board on one side of the game window, thereby further improving the completeness of the advertisement.

Furthermore, whenever a member participates in a game, a varying advertising story is provided through the playing cards, thereby providing variety to the game but also considerably increasing curiosity and interest in the advertisement.

Moreover, there is provided a playing card game based on a scoring comparison method of determining a winner by comparing scores acquired in the game rather than a gambling game method of exchanging game money, thereby ensuring the soundness and performance of the game while overcoming a conventional problem in which a playing card game is regarded as a gambling game in which game money is exchanged.

DESCRIPTION OF DRAWINGS

FIG. 23 is a diagram illustrating the entry coupon account of one player based on FIG. 20.

MODE FOR INVENTION

First, terms used below will be described to help understanding of the present invention.

First, "playing cards" are cards used as media for playing card games, in which case they refer to a deck of cards created by converting an advertisement into a story. Individual cards constituting a deck of cards are marked with respective numbers, patterns, characters, and/or the like, and an advertisement may be converted into a story by a single line arrangement (a lateral arrangement, a vertical arrangement, a diagonal arrangement, a specific arrangement, or the like) of the cards.

For example, the playing cards are marked with numbers in order to indicate differences in sequence, four cards are allocated to each of the numbers, and the four cards are marked with patterns (e.g., a spade, a diamond, a heart, and a clover) in order to indicate differences among them.

In this case, numbers and patterns are marked on the upper or lower portions (e.g., left upper portions) of first sides of the cards in small sizes and characters or images are marked on the center portions of the cards in sizes larger than those of the numbers and the patterns, thereby allowing an advertisement to be converted into a story.

Figure 4:
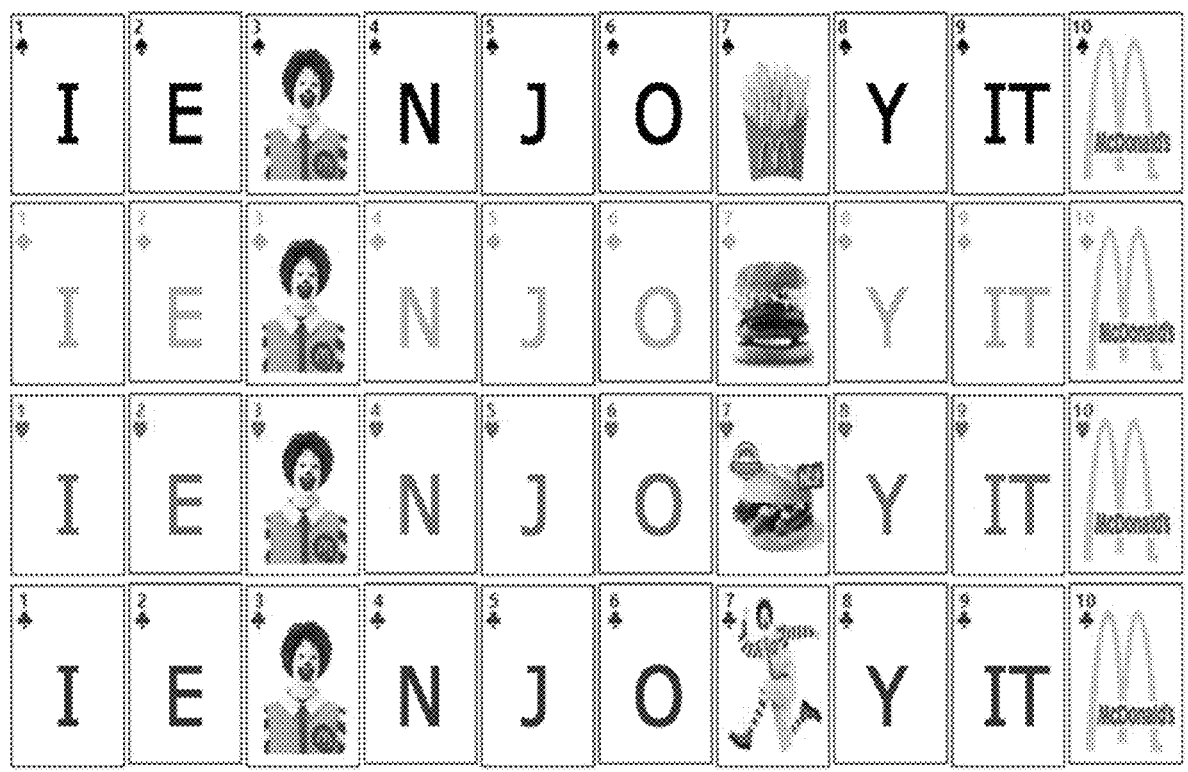
FIGS. 4 to 7 are diagrams showing various examples of playing cards, in which an advertisement is converted into a story, which are applied to the present invention.
Figure 5:
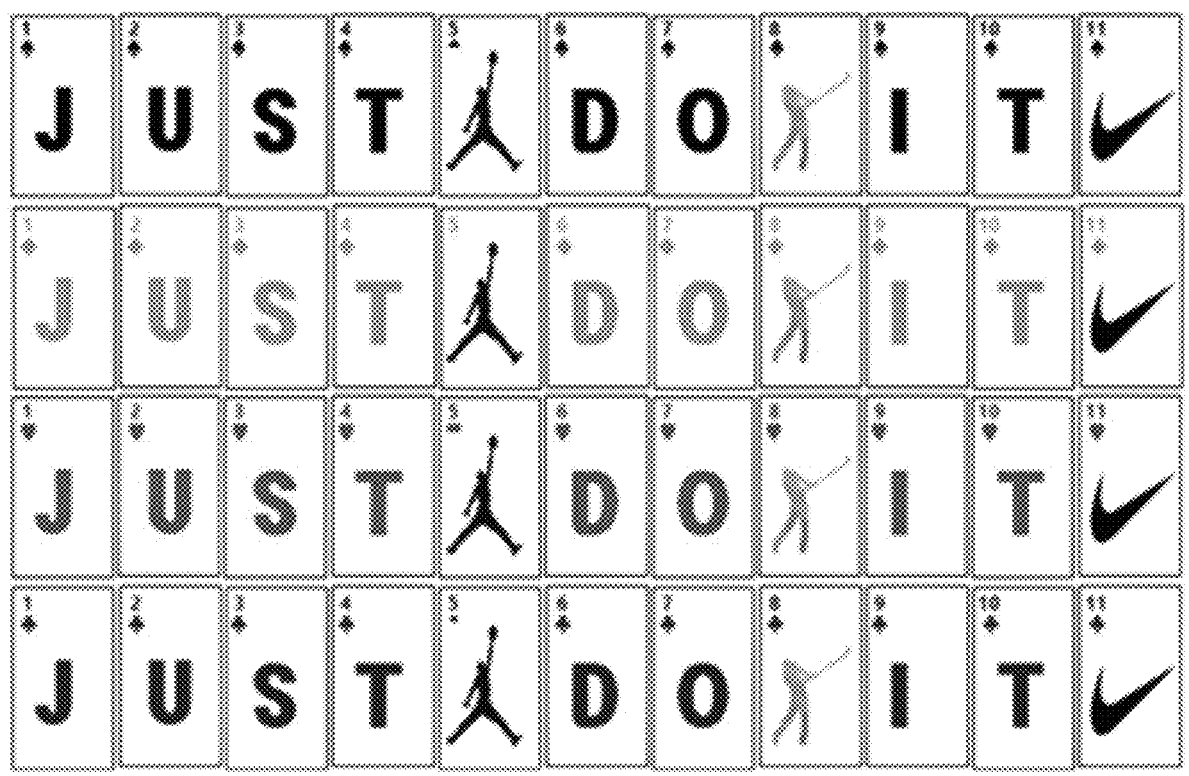
Figure 6:
Figure 7:
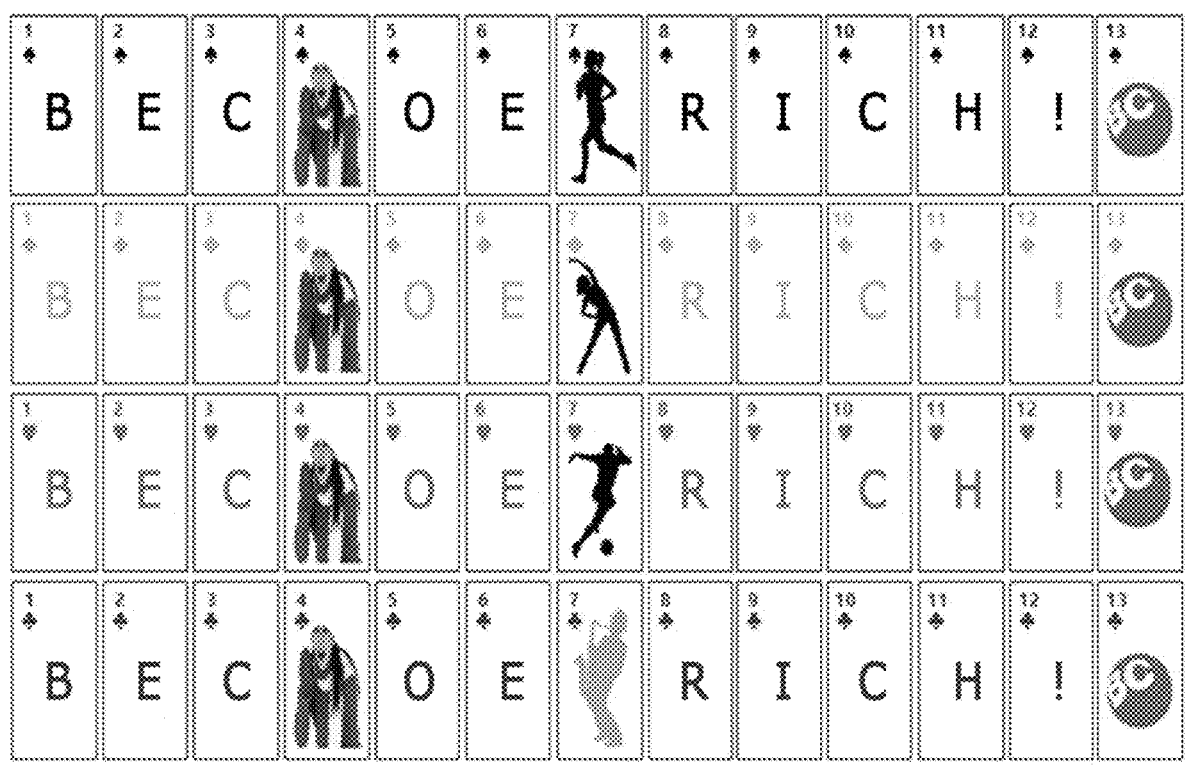

Such a deck of cards includes a total of 40 cards=10 lateral cards×4 vertical cards in FIG. 4, a total of 44 cards=11 lateral cards×4 vertical cards in FIG. 5, a total of 48 cards=12 lateral cards×4 vertical cards in FIG. 6, and a total of 52 cards=13 lateral cards×4 vertical cards in FIG. 7.

In other words, the deck of cards applied to the present invention may include various numbers of cards, and FIGS. 4 to 7 show that advertisements are converted into stories in lateral arrangements.

The "card arrangement board" is a collection of cards which are configured to be arranged in the same configuration as the playing cards (hereinafter 'cards') and in which a card acquired during a game by a player can be automatically arranged at a predetermined location according to its sequential position and pattern.

Furthermore, the card arrangement board is provided to each player who participates in a game to allow a card acquired by a player through a game to arrange the card. The card arrangement board serves as a game that imposes a score according to an arrangement state, as well as an advertisement (window) that allows an advertisement contained in playing cards to be clearly revealed.

Figure 8:
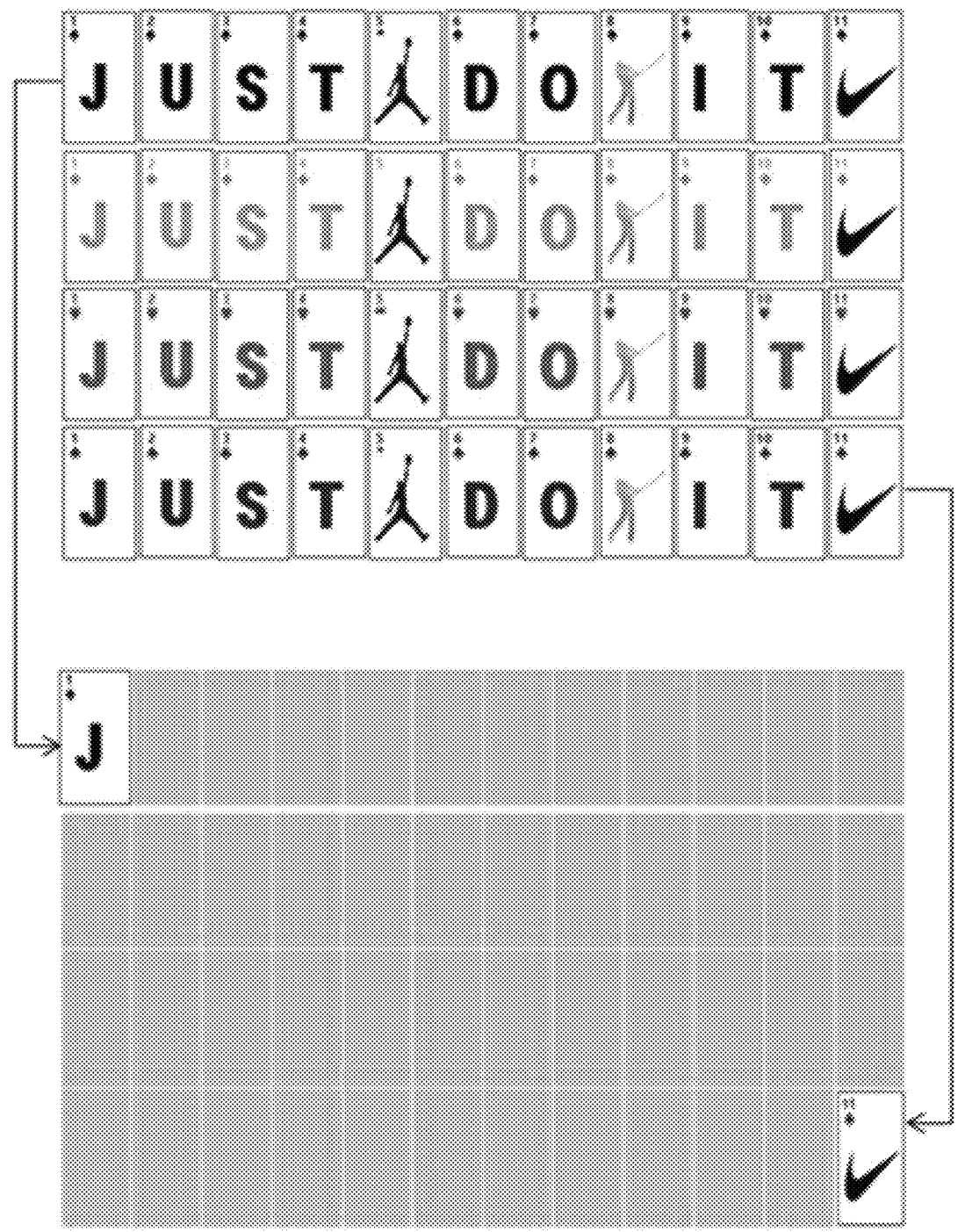
FIGS. 8 and 9 are diagrams illustrating the sequence in which playing cards, in which an advertisement is converted into a story, are arranged on a card arrangement board and which is applied to the present invention.

In FIG. 8, when a deck of cards (FIG. 5) includes a total of 44 cards=11 lateral cards×4 vertical cards, the card arrangement board is configured to include a total of 44 spaces=11 lateral spaces×4 vertical spaces in a one-to-one correspondence with the deck of cards, so that individual cards constituting the deck of cards are arranged in the corresponding spaces of the corresponding card arrangement board.

Figure 9:
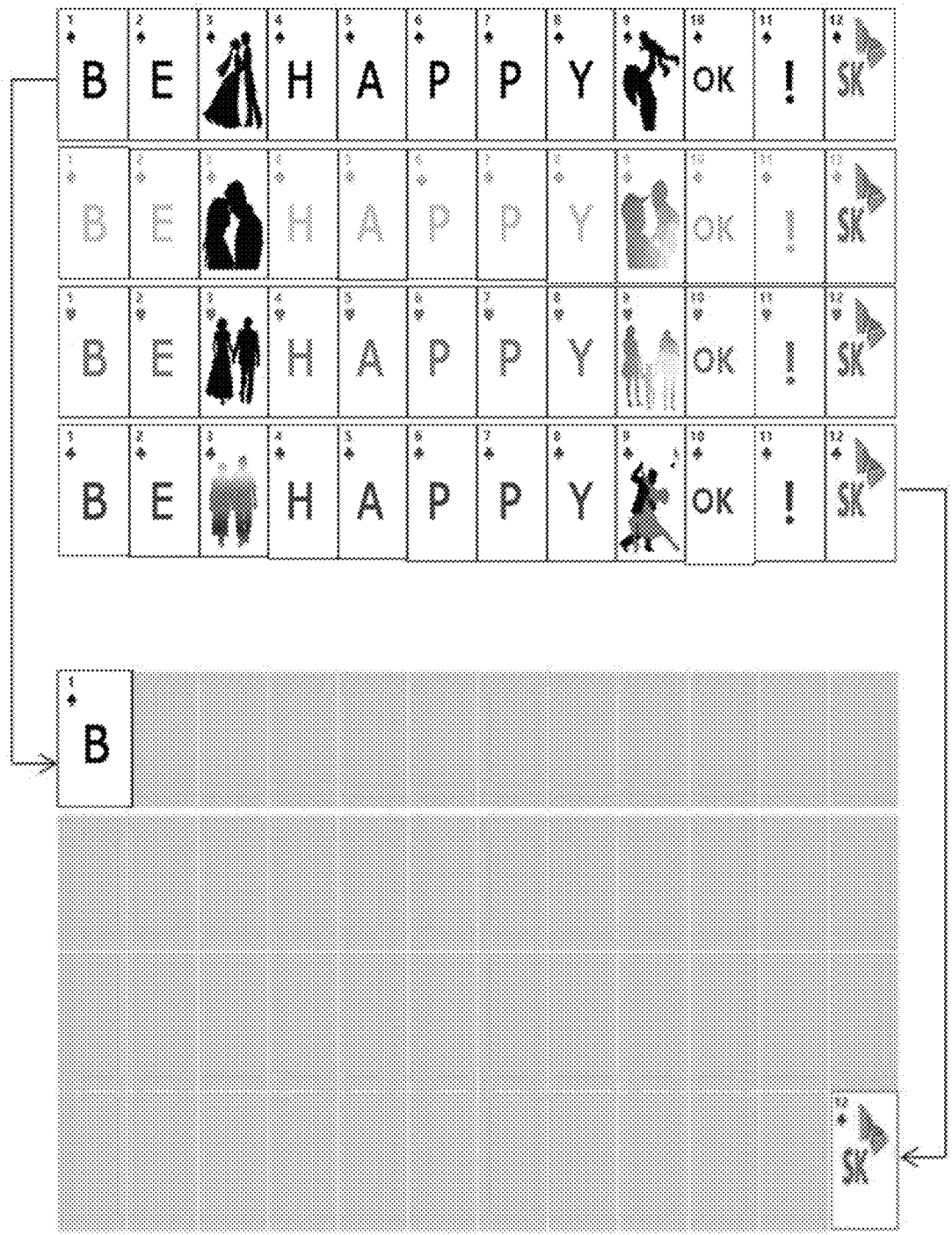

In the same manner, in FIG. 9, when a deck of cards (FIG. 6) includes a total of 48 cards=12 lateral cards×4 vertical cards, the card arrangement board is also configured to include a total of 48 spaces=12 lateral spaces×4 vertical spaces in a one-to-one correspondence with the deck of cards, so that individual cards constituting the deck of cards are arranged in the corresponding spaces of the corresponding card arrangement board.

The term 'round' has the same concept as that in boxing. The process that extends from the start of a game after the dealing out of cards to players to the end of the corresponding game is referred to as a round.

For example, when the number of games per game is set to 10 rounds and the game is played, it is not until a 10th game corresponding to a final round is finished that a final winner is determined.

Furthermore, the term "chok" refers a case where if a player discards one card in his or her hand onto a table and flips over an identical card, the player collects the two cards, the term "sseul" refers to a case where a player collects all the face-up cards on the table once, the term "ttadak" refers to a case where a player collects two identical face-up cards on the table one through discarding and one through flipping over, the term "hand-poktan" refers to a case where a player collects an identical face-up card on the table by using three identical cards in his or her hand, and the term "table-poktan" refers to a case where a player collects three face-up cards on the table by using the remaining one card.

When a player performs the above-described chok, sseul, ttadak, hand-poktan, or table-poktan, the player has the right to select (click) one card arranged on an opponent player card arrangement board and to move and arrange the one selected card on his or her player card arrangement board.

Furthermore, the "score comparison method" is a method in which players accumulate scores obtained during a game on their scoreboards and the winner of the game is determined by comparing the mutual scores at the end of the game.

When the game is played in this way, there is no occurrence of game money exchanged between players. Therefore, the players do not need to purchase game money in order to play the game, and accordingly, gambling activities, i.e., the biggest problem of the playing card game, is fundamentally blocked.

The configurations and operations of embodiments of the present invention will be described below with reference to the accompanying drawings.

Figure 1:
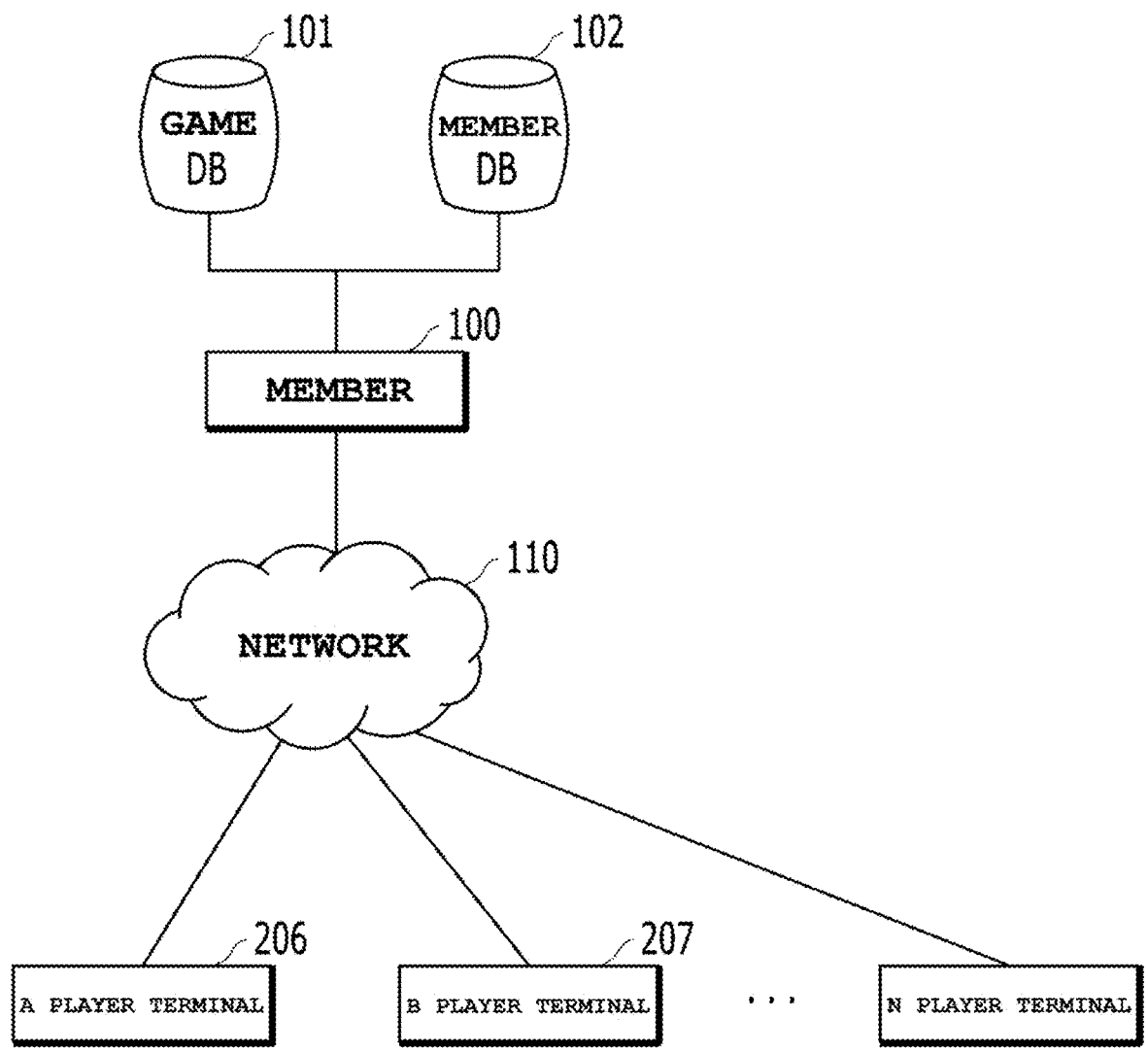
FIG. 1 is a diagram showing the configuration of a system for advertising through a playing card game according to an embodiment of the present invention.

FIG. 1 is a diagram showing the configuration of a system for advertising through a playing card game according to an embodiment of the present invention.

As shown in FIG. 1, a plurality of player terminals 206 and 207 is connected to a game server 100 over a network 110, and the game server 100 includes a game DB 101 and a member DB 102.

The player terminals 206 and 207 refer to input/output devices for communicating with the game server 100 over a network in order for players registered as members to play games. The player terminals 206 and 207 may be implemented as devices capable of connecting to a network via a wire or wireless connection and exchanging information such as not only desktop computers but also notebook computers, workstations, palmtop computers, personal digital assistants (PDAs), web pads, mobile communication terminals (smartphones), etc.

The player terminals 206 and 207 are each equipped with a web browser, i.e., an application program used to search web information, connect to the game server 100, and display game pages provided by the game server 100 on the player terminals.

When a player clicks a game start button displayed on a game page, various types of information necessary to run a game is received from the game server 100, and a new version of the game is downloaded from the game server when the game is an old version.

When the player terminals 206 and 207 connect to the game server 100 and perform a game, data necessary to play a game is received from the game server 100, and game progress screens based on the received data are displayed on the player terminals.

The game server 100 provides game-related web pages to the player terminals in order to provide ab online game to players. On the web pages provided by the game server, operations, such as membership registration, player authentication, stadium selection, and game start, may be performed.

Furthermore, a game program is installed when the program for performing a game is not installed, and a game client is updated to a new version when a game program is an old version.

The game server 100 communicates with the player terminals 206 and 207 so that players can play a card game using playing cards adapted to convert an advertisement into a story online.

When a player connects to the game server 100, the game server 100 informs the member DB 102 of the connection to update player connection information, and provides information about a list of game rooms opened in the game server 100, the current states of the respective game rooms, i.e., states in which players are playing the game, a state in which one player is waiting for the participation of another player, and an empty state to the player terminal with reference to the game DB 101.

In this case, the game room refers to a cyber space in which a game proceeds independently. A plurality of game rooms may be created in one game server. In the following, two players may enter and play a game in the game room.

A player may create a game room or participate in a game room, and accordingly the game server 100 incorporates this information into the game DB 101.

Furthermore, when the player terminals 206 and 207 are connected, the game server 100 provides information about an already connected player to the player terminals 206 and 207.

Part of the player information, e.g., a player identifier, an avatar, a gender, and a rating, may be provided first, and other detailed information may be provided separately when the player requests the detailed information.

Furthermore, a chat window may be created and provided to the player terminals so that players can chat with each other.

Furthermore, when a player enters a game room and requests to start a game, the game server 100 provides a game progress screen including a card arrangement board to the player terminal, deals the playing cards, and proceeds with an online game in accordance with a predetermined method while exchanging data with the player terminal based on the operations of the player.

In this case, with reference to the score information of the game DB 101, the game server 100 calculates the combined score of the cards obtained by the player while playing the game, and transfers the calculated score to the player terminal.

In this case, as the game proceeds, the initial score of the card obtained by the player is not fixed, and the score is frequently changed according to the connected and combined state of the cards. Sometimes the score of all cards constituting a combination including a corresponding card, is changed.

In other words, the game server 100 outputs a game progress screen including a card arrangement board to a plurality of player terminals, and deals out the cards as multiple player cards (cards held by the players), table cards (table face-up cards), and table standby cards (table face-down cards). When the player plays the game through the player terminal 206 or 207 and acquires a table card, the game server 100 moves and arranges the acquired card to and on the corresponding player's card arrangement board and awards a score according to the combination of the cards. When the combination is changed in the course of the game, the game server 100 automatically changes the score according to the combination and provides the score to the player terminal.

Furthermore, when the player arranges cards on one overall lateral row of the card arrangement board in the course of the game and thus completes an advertising story, the game server 100 offers an entry coupon to the corresponding player terminal.

Furthermore, the game server 100 outputs a storytelling advertisement for advertising a corporate brand onto a card arrangement board, and outputs a product advertisement associated with the storytelling advertisement onto a product advertisement window located on one side.

Furthermore, when a game consisting of a plurality of rounds (e.g., 10 rounds) is finished, the game server 100 decides a winner (a winning player) by accumulating the scores awarded to the two players in a plurality of rounds and comparing the accumulated scores with each other, and offers an entry coupon to the winning player's player terminal.

Furthermore, the game server draws a winning coupon from a plurality of offered entry coupons, announces a prize winner, and pays prize money to the corresponding prize winner.

In this case, the prize money is prepared by accumulating a certain percentage of advertising sales generated as the game proceeds.

The game DB 101 and the member DB 102 provided in the game server 100 store various types of information necessary to provide an online game to players, and provide this information in response to a request from the game server 100.

This information includes game information stored in the game DB, game room-related information, advertisement information, game record information, entry coupon information, member (player) information stored in the member DB, and prize winner information.

The game information includes a plurality of pieces of card information adapted such that an advertisement is converted into a story and score information corresponding to combinations of cards.

The game room-related information includes a list of game rooms and information about one or more players who have entered each of the game rooms.

The advertisement information includes a storytelling advertisement and a product advertisement associated with the storytelling advertisement.

The member (player) information includes player identifiers, nicknames, avatars, ages, genders, ratings, history information, information about prize money held by players, and player connection information about game rooms to which players are currently connected.

Figure 2:
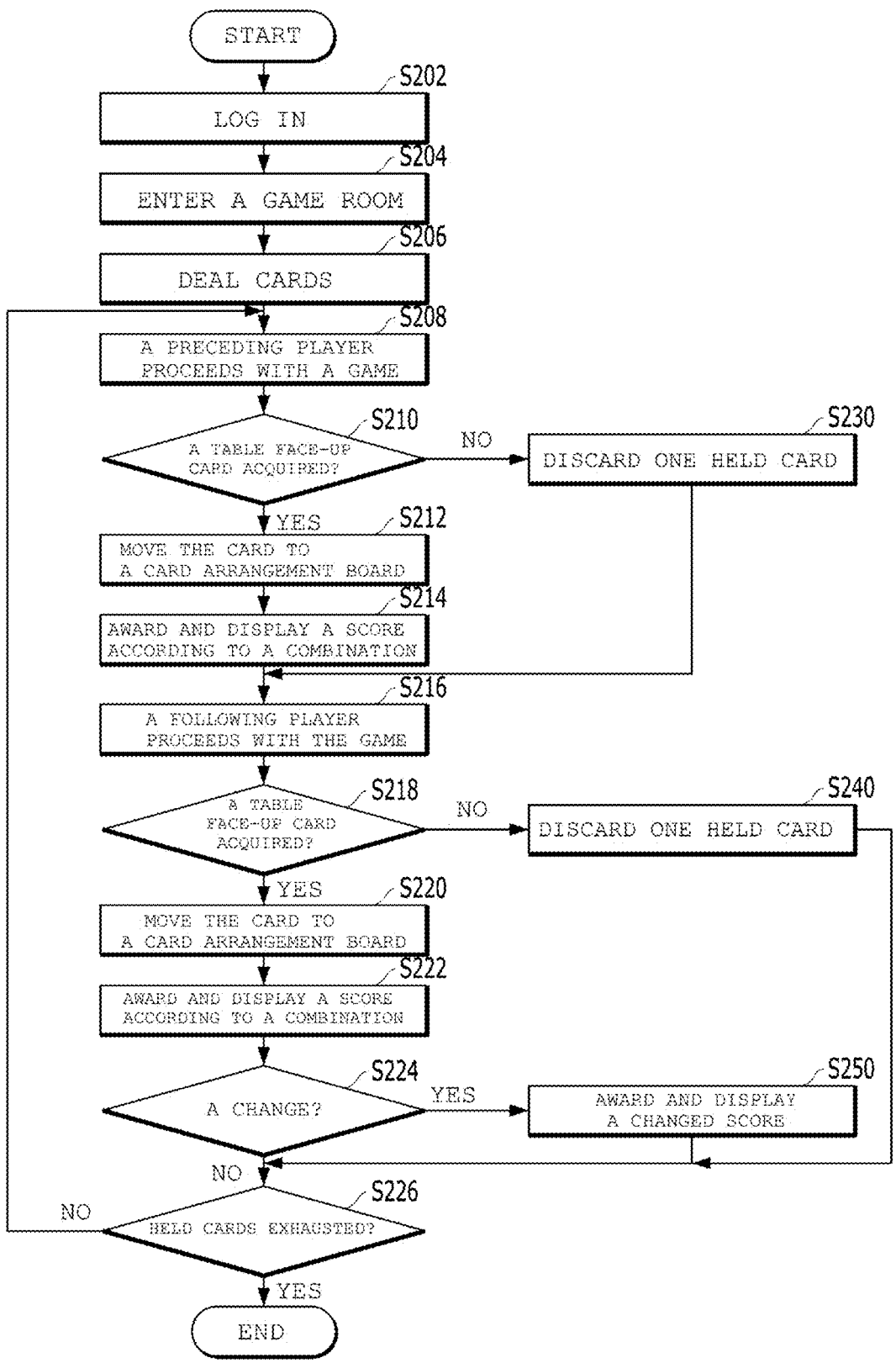
FIG. 2 is a flowchart showing a playing card game method according to an embodiment of the present invention.

FIG. 2 is a flowchart showing a playing card game method according to an embodiment of the present invention.

As shown in FIG. 2, when the player terminals 206 and 207 connect with the game server 100 over the network 110, perform login by entering IDs and passwords at step S202, and two players enter a game room at step S204, the game server 100 outputs a game progress screen to be described later to each of the player terminals.

Next, when the game server 100 receives a game start request from one player, it deals out randomly shuffled playing cards in which a corporate advertisement is converted into a story as preceding and following player cards (cards held by players), table cards (table face-up cards), and table standby cards (table face-down cards), and provides preceding and following player cards to preceding and following player terminals at step S206.

In this case, when a deck of cards includes 40 cards, the cards are dealt out as 8 cards held by each of the preceding and following players (a total of 16 cards), 16 table face-down cards, and 8 table face-up cards, as shown in table 1 below:

TABLE 1

Playing Card Dealing Method

| The constituent cards of a deck of playing cards | Cards held by player A | Cards held by player B | Floor face-down cards | Floor face-up cards |
|---|---|---|---|---|
| 40 cards (4 × 10) | 8 cards | 8 cards | 16 cards | 8 cards |
| 44 cards (4 × 11) | 9 cards | 9 cards | 18 cards | 8 cards |
| 48 cards (4 × 12) | 10 cards | 10 cards | 20 cards | 8 cards |
| 52 cards (4 × 13) | 11 cards | 11 cards | 22 cards | 8 cards |

Furthermore, when a deck of cards includes 44 cards, the cards are dealt out as 9 cards held by each of the preceding and following players (a total of 18 cards), 18 table face-down cards, and 8 table face-up cards.

Furthermore, when a deck of cards includes 48 cards, the cards are dealt out as 10 cards held by each of the preceding and following players (a total of 20 cards), 20 table face-down cards, and 8 table face-up cards.

Moreover, when a deck of cards includes 52 cards, the cards are dealt out as 11 cards held by each of the preceding and following players (a total of 22 cards), 22 table face-down cards, and 8 table face-up cards.

Figure 10:
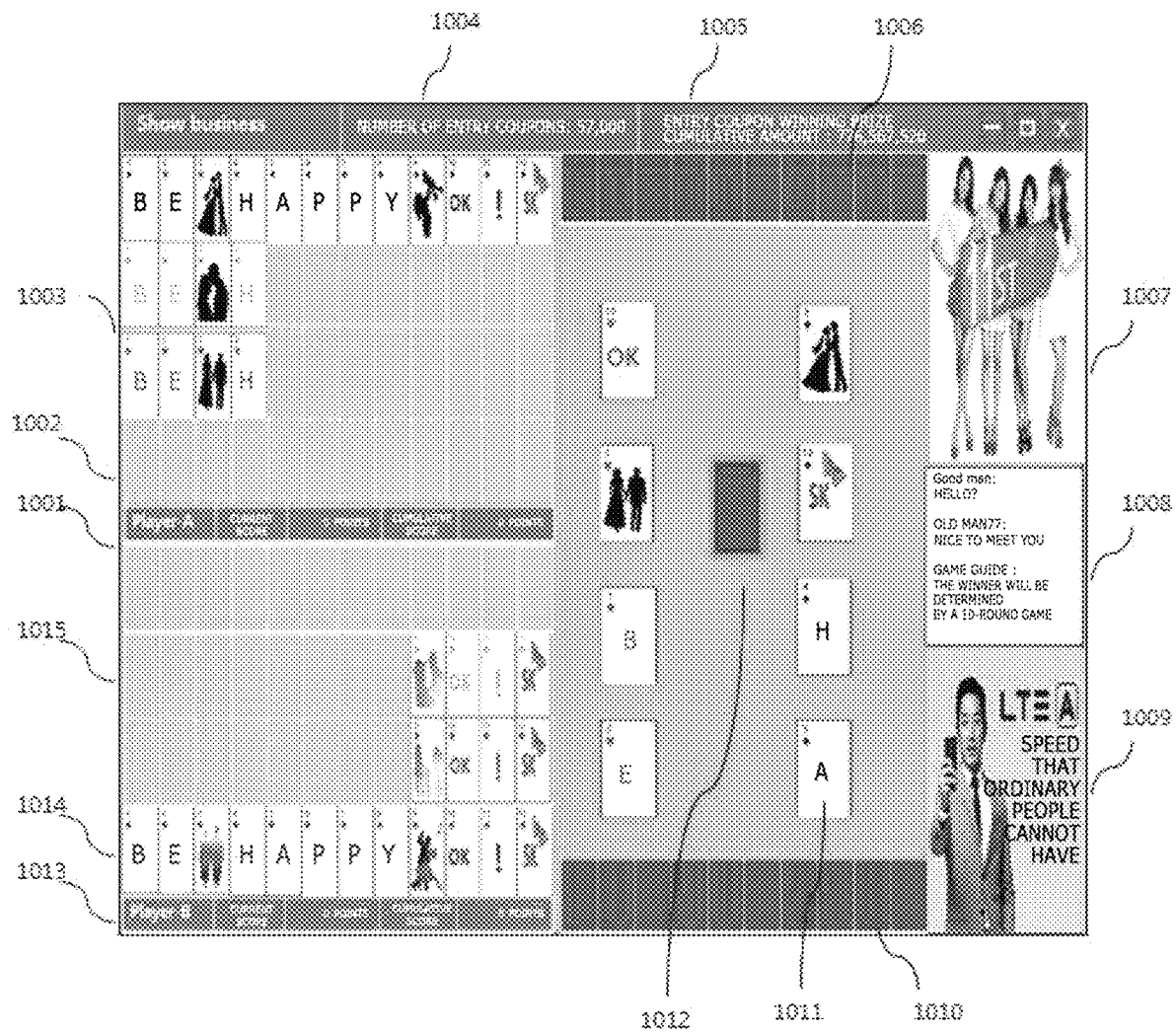
FIG. 10 is a view showing an example of a playing card game window screen according to an embodiment of the present invention.

Meanwhile, the game progress screen may be configured, as shown in FIG. 10. A preceding player card arrangement board 1002 and a following player card arrangement board 1015 are located on the up and down portions of a left side, and score provision windows 1001 and 1013 are located below the preceding player card arrangement board 1002 and the following player card arrangement board 1015, respectively.

Furthermore, table standby cards 1012 are located at the center of the right side of the card arrangement boards 1002 and 1015, table cards 1011 are located around the table standby cards, and preceding player cards 1006 and following player cards 1010 are located above and below the table cards, respectively. A first product advertisement window 1007, a chat window 1008, and a second product advertisement window 1009 are located on the right side of the game progress screen.

Furthermore, score provision windows 1001 and 1013 are located below the preceding and following card arrangement boards 1002 and 1015, and an entry coupon issuance number bar 1004 and an entry coupon winning prize accumulative amount bar 1005 are located on the uppermost side of the game progress screen.

Reference symbols 1003 and 1014 denote cards acquired by the preceding player and cards acquired by the following player, respectively.

Figure 11:
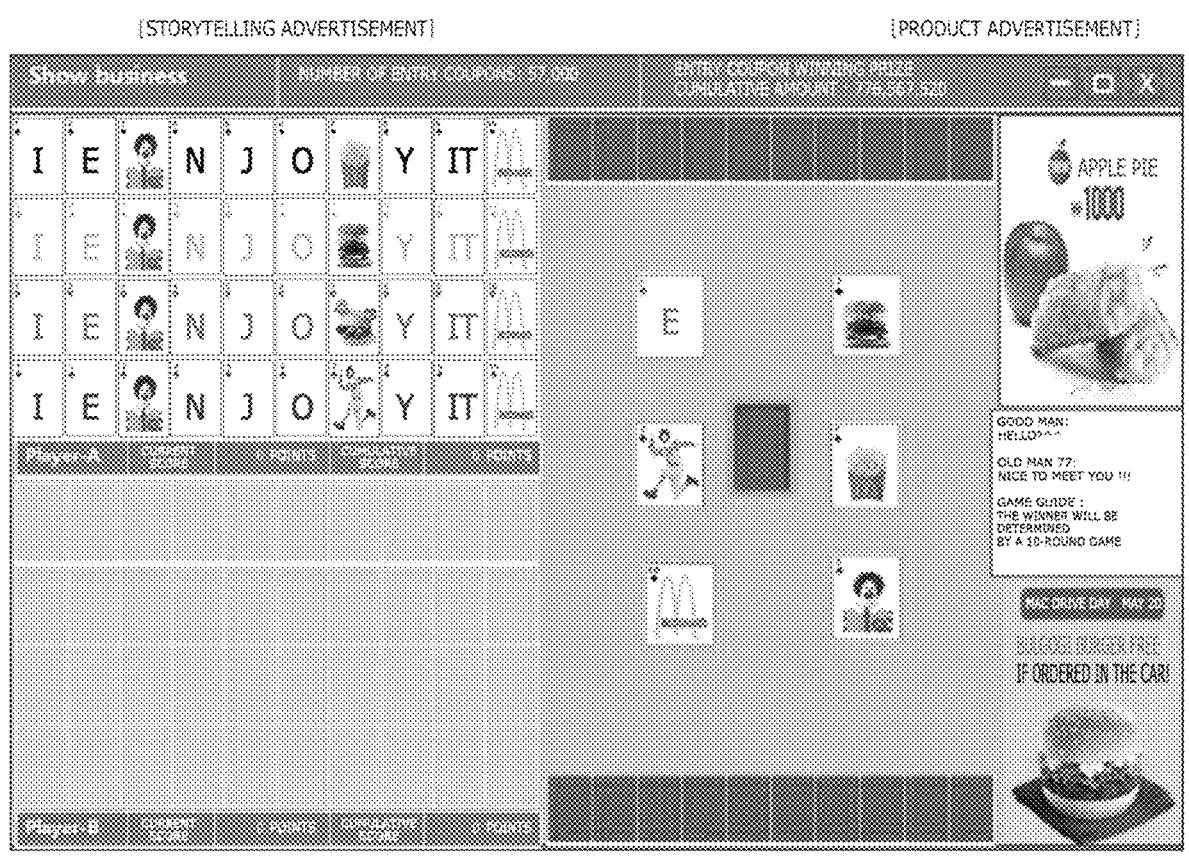
FIGS. 11 to 13 are views illustrating various examples of a method for advertising through a playing card game window screen according to an embodiment of the present invention.
Figure 12:
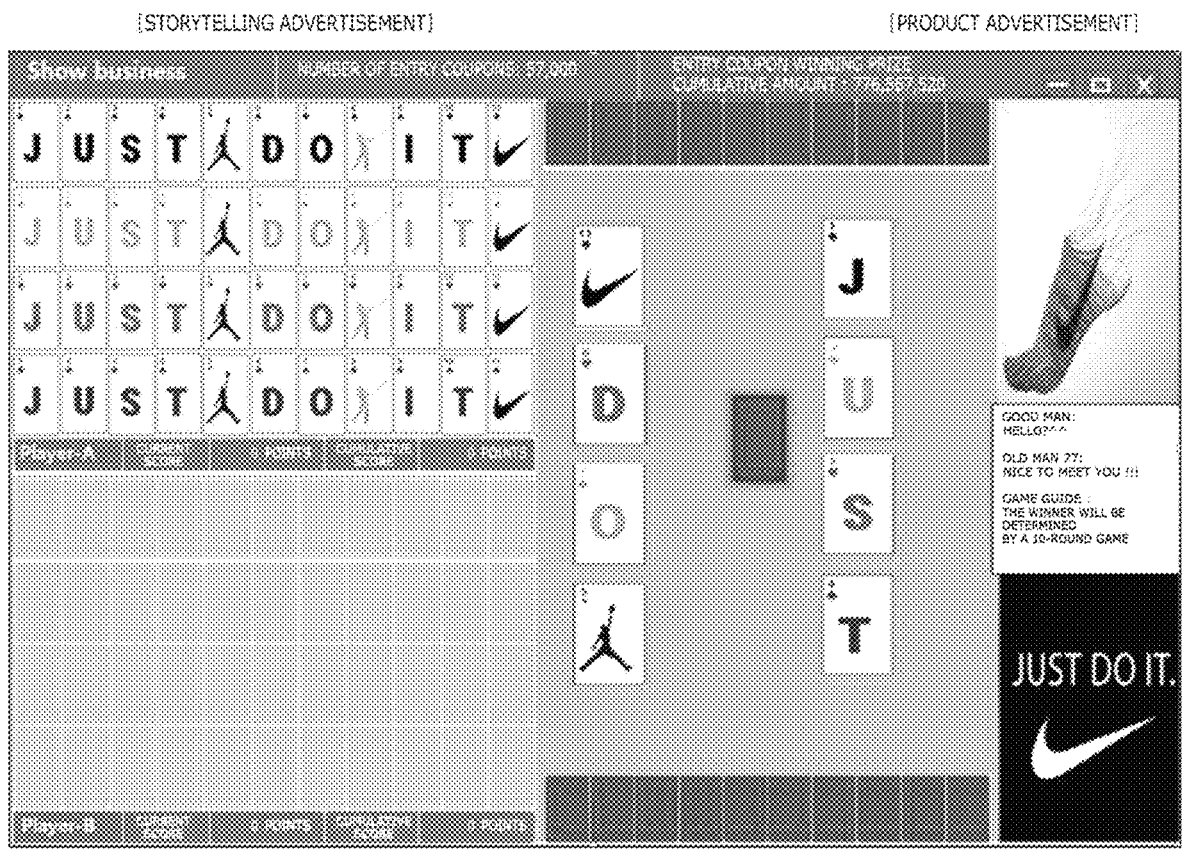
Figure 13:
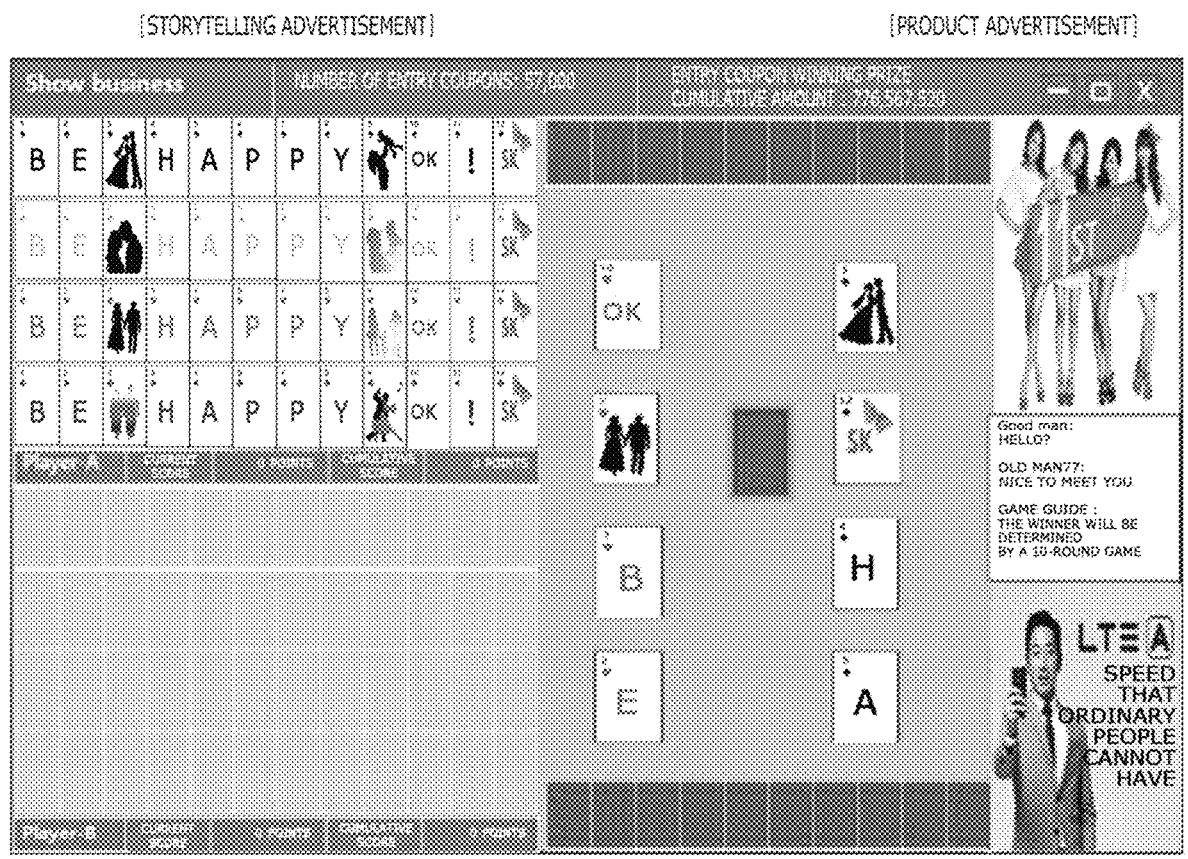

By configuring the game progress screen in this way, a storytelling advertisement may be presented through the card arrangement boards 1002 and 1015 on the left side, and product advertisements may be presented through the product advertisement windows 1007 and 1009 on the right side. This can also be confirmed in the corporate advertisements of FIGS. 11 to 13.

After the cards have been dealt out, the preceding player proceeds with the game at step S208.

In other words, the preceding player presents any one of the preceding player cards (the cards held by the preceding player) onto the table, flips over one of the table standby cards, and checks whether there a card that is the same as the table cards (the table face-up cards) at step S210.

If there is the same card, the game server determines that the corresponding table card is acquired, and moves and arranges the acquired card (1003 of FIG. 10) to and at a corresponding location of the preceding player card arrangement board at step S212, and awards a new score when the score is acquired by the arrangement and displays the score on the score provision window at step S214.

If there is no same card, the game server allows the preceding player card (the card held by the preceding player) or the flipped-over table standby card to become table cards at step S230.

Next, the following player proceeds with the game at step S216.

In other words, the following player presents any one of the following player cards (the cards held by the following player) onto the table, flips over one of the table standby cards, and checks whether there a card that has the same number (month) as the table cards (the table face-up cards) at step S218.

If there is a card having the same number, the game server determines that the corresponding table card is acquired, and moves and arranges the acquired card (1014 of FIG. 10) to and at a corresponding location of the following player card arrangement board at step S220, and awards a new score when the score is acquired by the arrangement and displays the score on the score provision window at step S222.

Furthermore, when changes occur in the card combinations of the preceding player card arrangement board and the following player card arrangement board by the playing of the game by the following player at step S224, changed scores are awarded and displayed on the score provision windows at step S250.

If there is no card having the same number, the game server allows the following player card (the card held by the following player) or the flipped-over table standby card to become table cards at step S240.

The preceding player and the following player repeat the above-described process until all their player cards (held cards) are exhausted and a corresponding round is ended at step S226. Through this process, the preceding and following players acquire scores for the round.

Table 2 below is a table illustrating an example of a method for awarding scores according to the combination of cards arranged on the card arrangement board.

TABLE 2 method for awarding scores

| Card arrangement board | The form of completed card arrangement | Acquired score for each card | Remarks |
|---|---|---|---|
| Column | incomplete | 1 point per card | arithmetical score awarding |
|  | complete 1 column | 2 points per card |  |
|  | complete successive 2 columns | 3 points per card |  |
|  | complete successive 3 columns | 4 points per card |  |
|  | complete successive 4 columns | 5 points per card |  |
|  | complete successive 5 columns | 6 points per card |  |
|  | complete successive | 7 points per card |  |

TABLE 2-continued method for awarding scores

| Card arrangement board | The form of completed card arrangement | Acquired score for each card | Remarks |
|---|---|---|---|
| | 6 columns complete successive | 8 points per card | |
| | 7 columns complete successive | 9 points per card | |
| Row | 8 columns complete 1 row | Total score × 2 | geometrical score awarding |
| | complete 2 rows | Total score × 4 | |
| | complete 3 rows | Total score × 8 | |

When cards are vertically arranged on the card arrangement board, each column includes 4 spaces. 1 point per card is awarded when only one column is not completed, 2 points per card are awarded when one column is completed, 3 points per card are awarded when two columns are successively completed, 4 points per card are awarded when three columns are successively completed, and 9 points per card are awarded when eight columns are successively completed (i.e., in connection with vertical arrangements, scores are awarded in an arithmetical manner).

Figure 14:
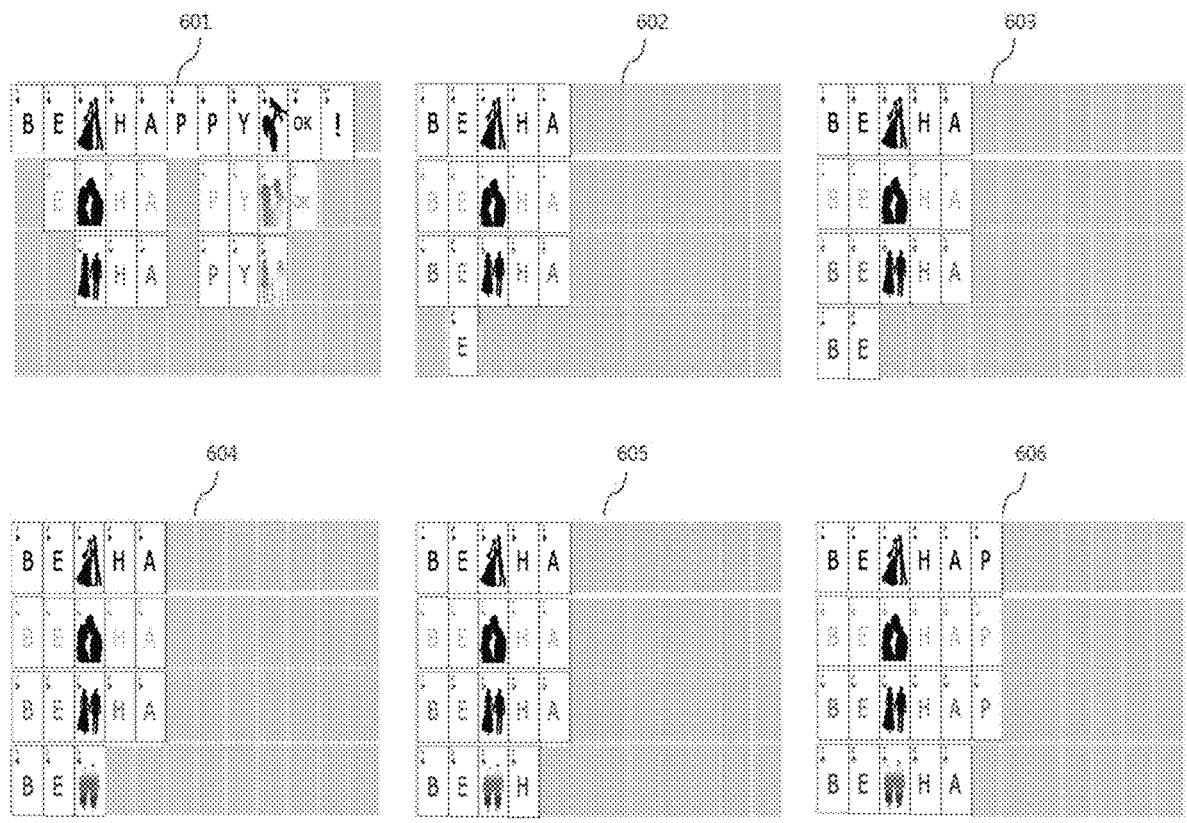
FIGS. 14 to 17 are views illustrating a method of acquiring scores in a playing card game according to an embodiment of the present invention.
Figure 15:
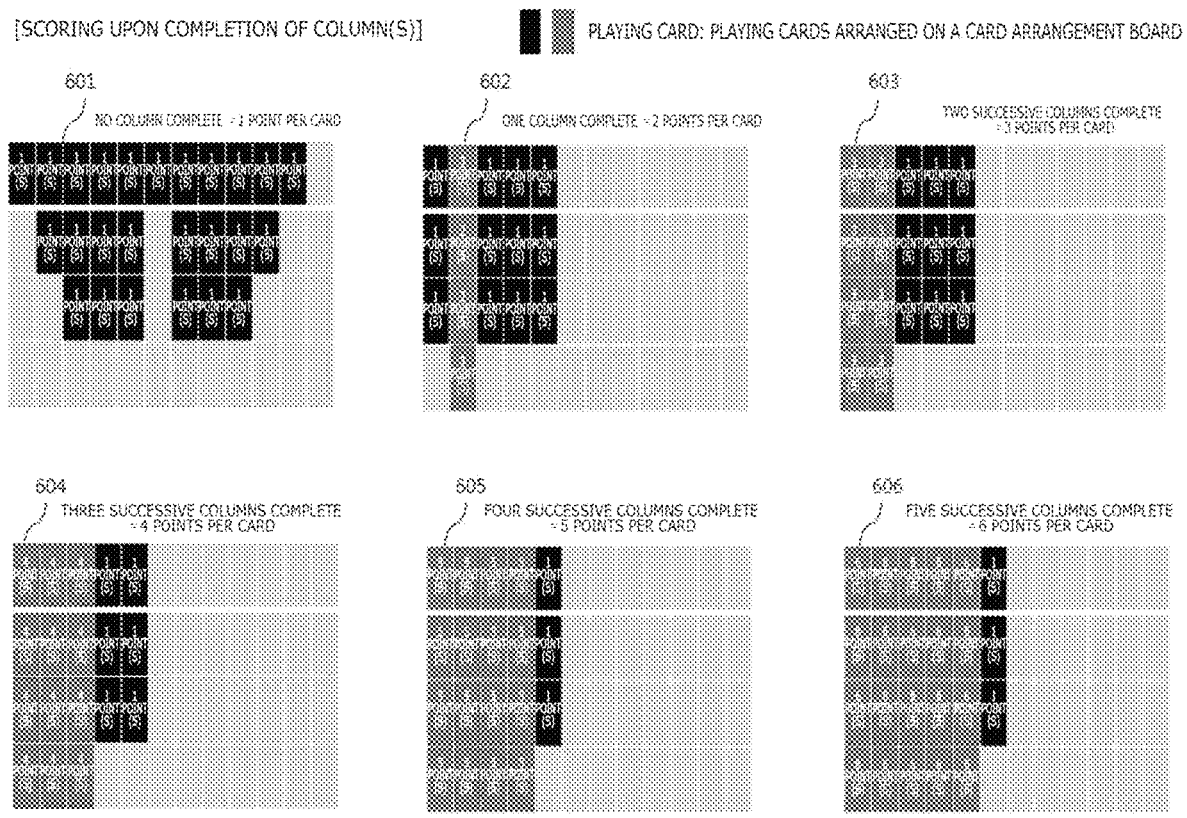

For example, when the cards are actually arranged on the card arrangement board as shown in FIG. 14, 1 point per card is awarded to the cards 601 that do not complete one column, 2 points per card are awarded to the cards 602 that complete one column, 3 points per card are awarded to the cards 603 that complete two columns, 4 points per card are awarded to the cards 604 that complete three columns, 5 points per card are awarded to the cards 605 that complete four columns, and 6 points per card are awarded to the cards 606 that complete five columns, as shown in FIG. 15.

In the state in which the score has been awarded to the vertical card arrangement, a score twice the vertical score is awarded when one row including a plurality of spaces is completed, a score four times the vertical score is awarded when two rows are completed (regardless of successive completion), and a score eight times the vertical score is awarded when three rows are completed (regardless of successive completion) (i.e., in connection with lateral arrangements, scores are awarded in an geometrical manner).

Figure 16:
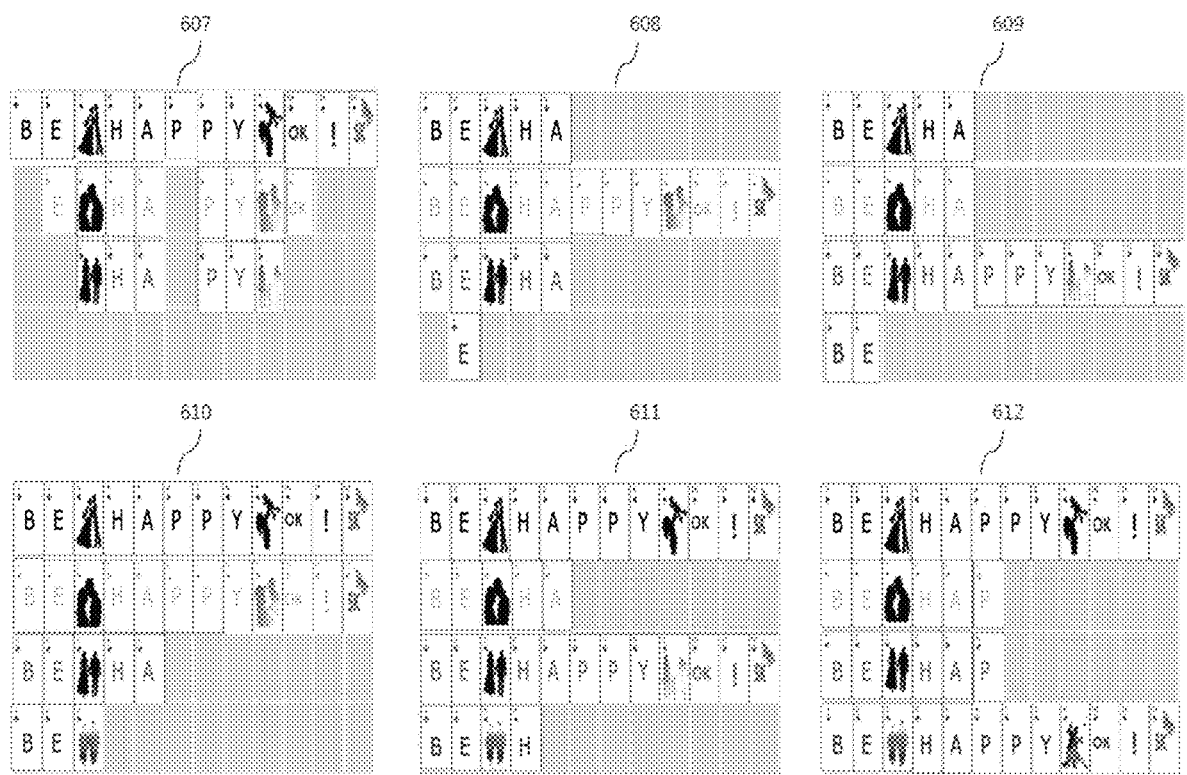
Figure 17:
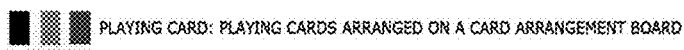
Figure 17:
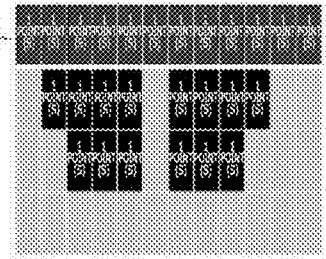
Figure 17:
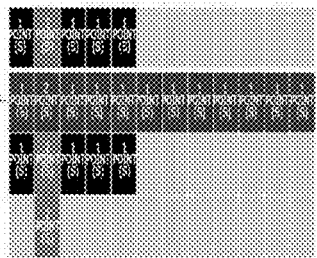
Figure 17:
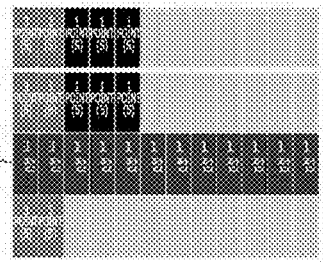
Figure 17:
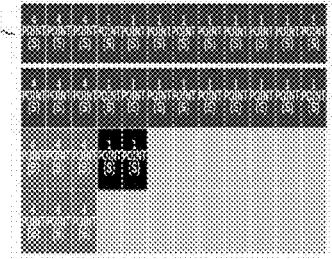
Figure 17:
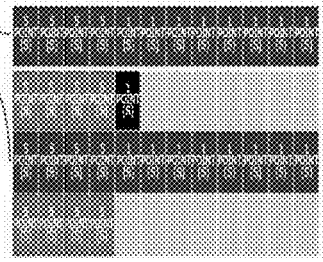
Figure 17:
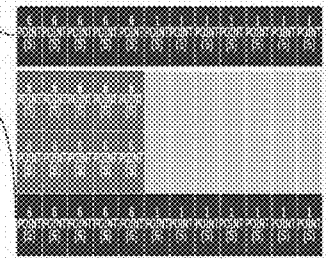

For example, when the cards are actually arranged on the card arrangement board as shown in FIG. 16, a score twice the vertical score is awarded to the cards 607, 608 and 609 that complete one row, and a score four times the vertical score is awarded to the card 610, 611 and 612 that complete two rows, as shown in FIG. 17.

The method for awarding scores based on card arrangements shown in FIGS. 14 to 17 shows an example of the present invention, and scores may be awarded based on various card arrangements.

For example, scores may be awards in such a manner that 1 point per card is awarded to the cards that do not complete a column including four spaces on the card arrangement board, 2 points per card are awarded to the cards that complete a column and are connected to each other laterally, 3 points per card are awarded to the cards that successively complete two columns and are connected to each other laterally, and 8 points per card are awarded to the cards that successively complete seven columns and are connected to each other laterally.

Figure 3:
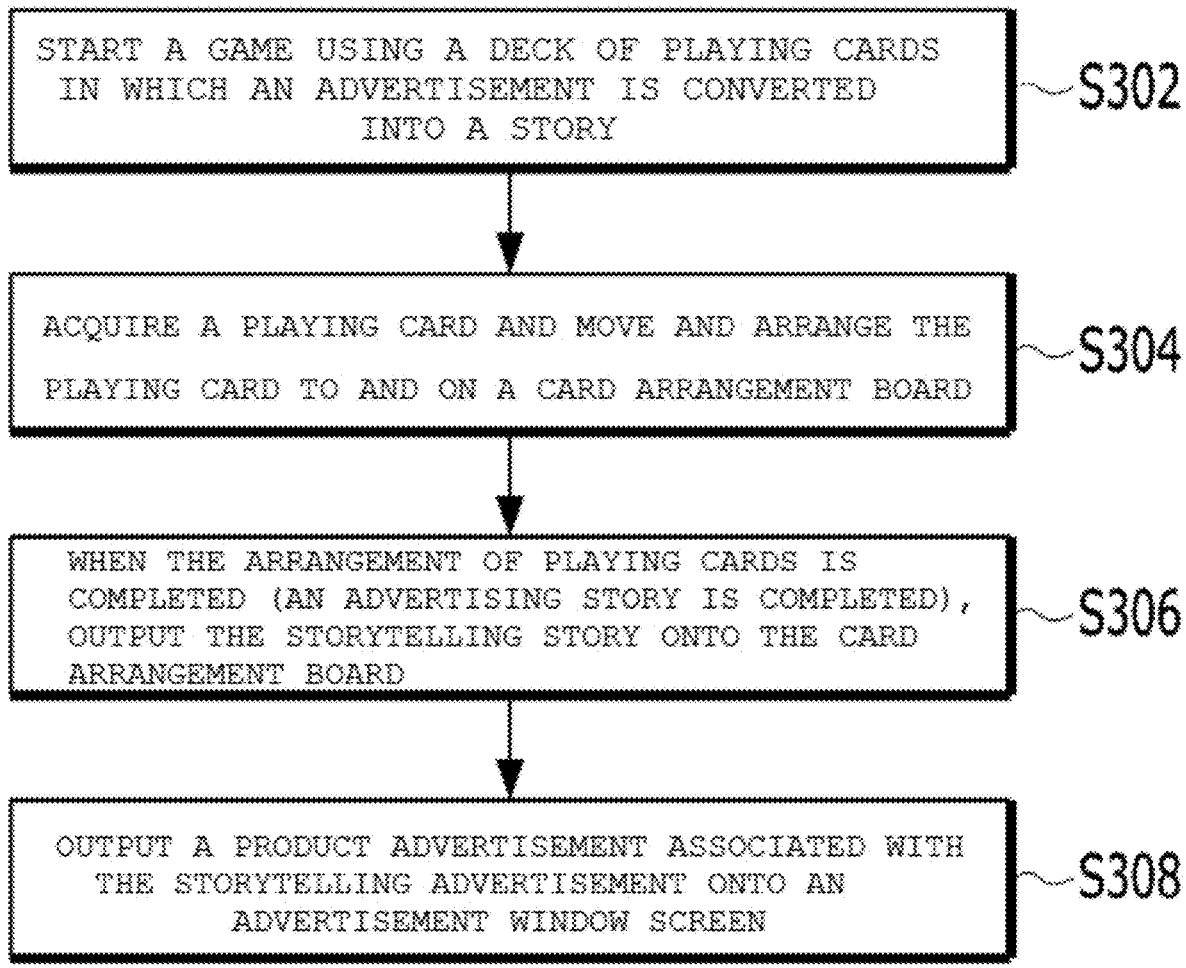
FIG. 3 is a flowchart showing an advertising method that is performed in conjunction with the playing card game method of FIG. 2.

FIG. 3 is a flowchart showing an advertising method that is performed in conjunction with the playing card game method of FIG. 2.

While a game is played in the sequence of FIG. 2, a game using a deck of playing cards in which an advertisement is converted into a story is started at step S302. When the preceding or following player acquires a player card and moves and arranges the card on the card arrangement board at step S304, a storytelling advertisement contained in the playing card is output at step S306.

Furthermore, the game server outputs a product advertisement associated with the corresponding storytelling advertisement onto the product advertisement window of each player at step S308.

For example, when the storytelling advertisements are output through the card arrangement boards 1002 and 1015 on the left side of FIG. 10, product advertisements associated with the storytelling advertisements are output through the first and second product advertisement windows 1007 and 1009 on the right side.

Figure 18:
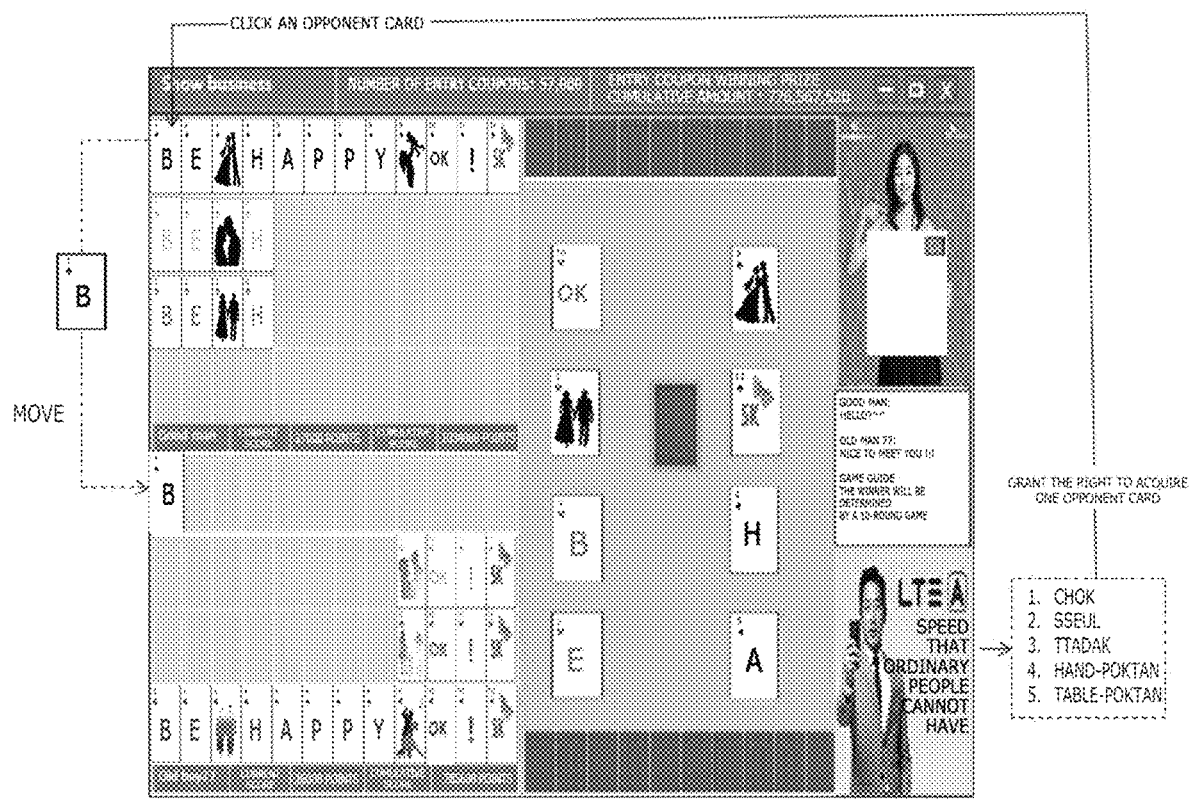
FIG. 18 is a view showing an example of a case in which a card is taken from an opponent card arrangement board during a playing card game according to the embodiment of the present invention.

FIG. 18 is a view showing an example of a case in which a card is taken from an opponent card arrangement board during a playing card game according to the embodiment of the present invention.

As shown in FIG. 18, when the following player performs, e.g., a chok, a sseul, a ttadak, a hand-poktan, or a table-poktan during the game, the game server invests the following player with a right to take one card from the cards arranged on the preceding player card arrangement board.

Accordingly, when the following player clicks one specific card (1 spade "") arranged on the preceding player card arrangement board displayed on the game progress screen via the following player terminal, the selected specific card is deleted from the preceding player card arrangement board and is moved to and arranged on the following player card arrangement board.

As a result, the card arrangements of the preceding and following players are changed, and thus scores are reduced or increased.

Figure 19:
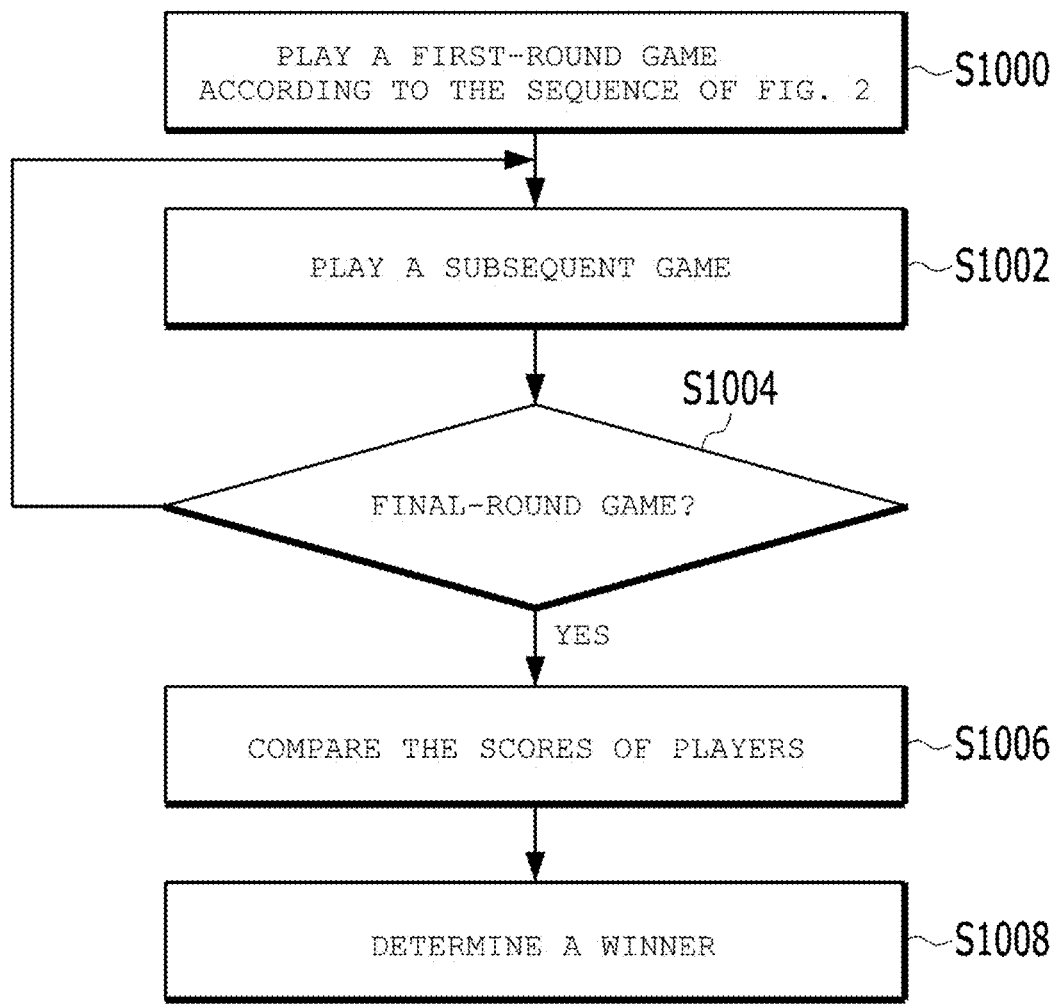
FIG. 19 is a flowchart showing the determination of a winner during a playing card game according to an embodiment of the present invention.

FIG. 19 is a flowchart showing the determination of a winner during a playing card game according to an embodiment of the present invention.

The preceding and following players play a first round game according to the sequence of FIG. 2 and are awarded scores based on arranged cards at step S1000.

After the first round game has been completed, the preceding and following players are awarded scored by playing a subsequent round game at step S1002, and an overall game is completed by repeating the above-described process up to a final round game at step S1004.

When the overall game is finished, the game server 100 accumulates the scores of the players and compares the cumulative scores at step S1006, and determines a player having obtained a more score to be a winner at step S1008.

Figure 20:
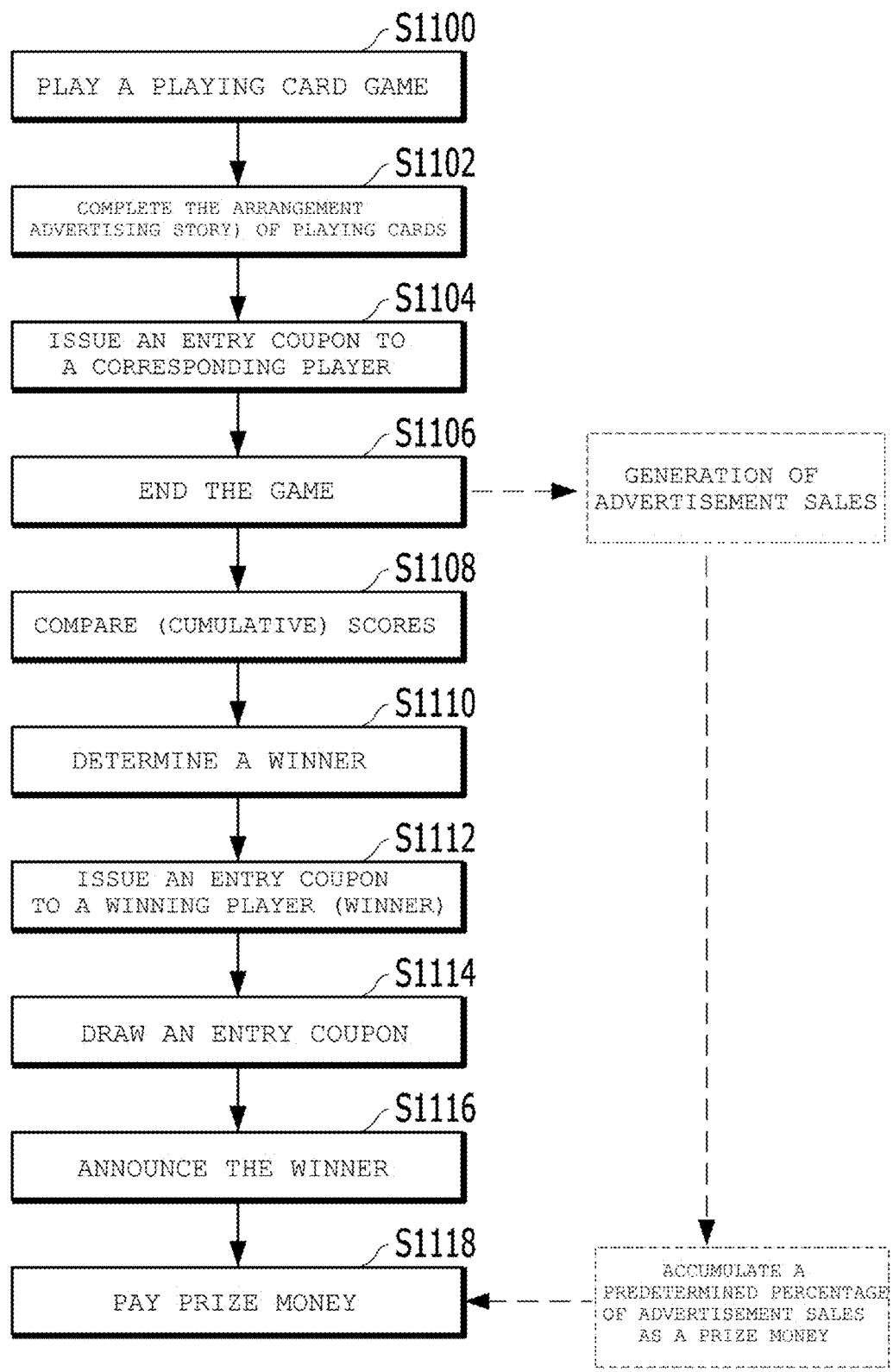
FIG. 20 is a flowchart showing a process of paying prize money according to the issuance of an entry coupon during a playing card game according to an embodiment of the present invention.

FIG. 20 is a flowchart showing a process of paying prize money according to the issuance of an entry coupon during a playing card game according to an embodiment of the present invention.

Figure 21:
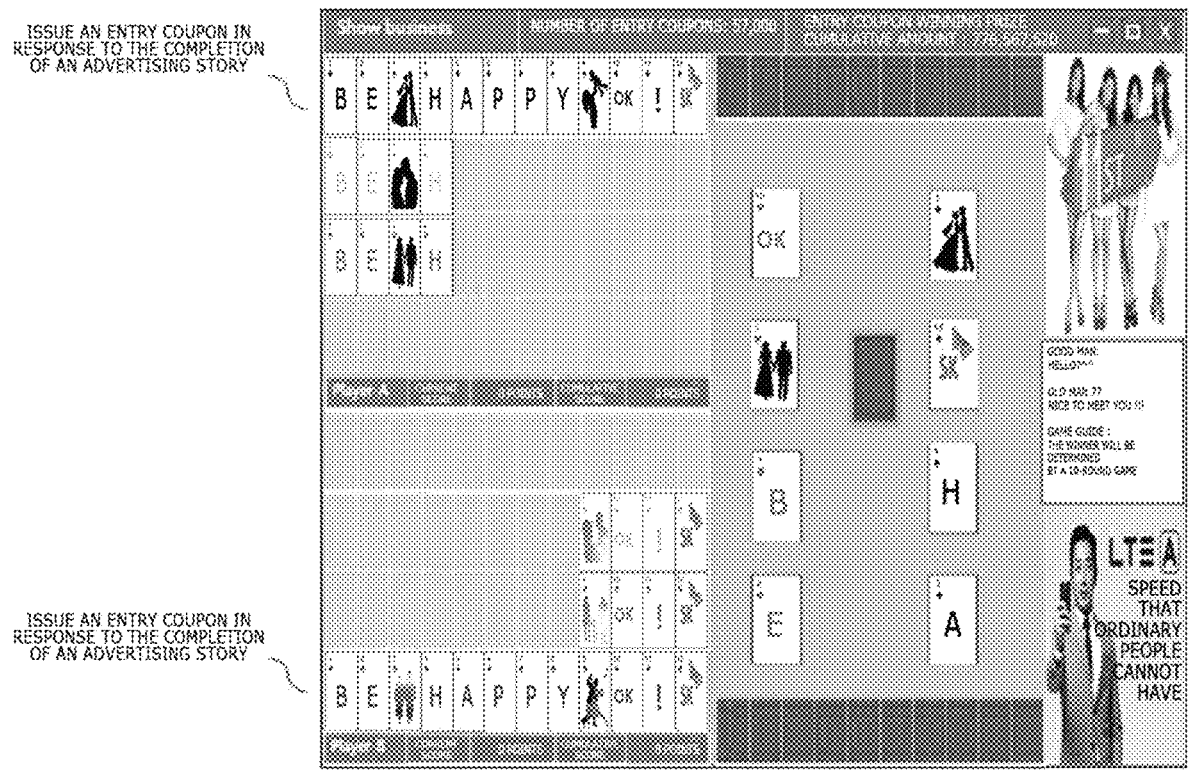
FIGS. 21 and 22 are exemplary views illustrating the flowchart of FIG. 20.

During a game using cards in which an advertisement is converted into a story at step S1100, when any one player arranges cards on the card arrangement board so that an advertising story can be completed at step S1102, the game server 100 issues an entry coupon and provides the entry coupon to a corresponding player terminal at step S1104, as shown in FIG. 21.

In this case, as described above, a storytelling advertisement is output onto the card arrangement board, and a product advertisement associated with the storytelling advertisement is output onto the product advertisement window screen.

Furthermore, a plurality of entry coupons may be issued to one player according to the arrangements of cards during the game.

Figure 22:
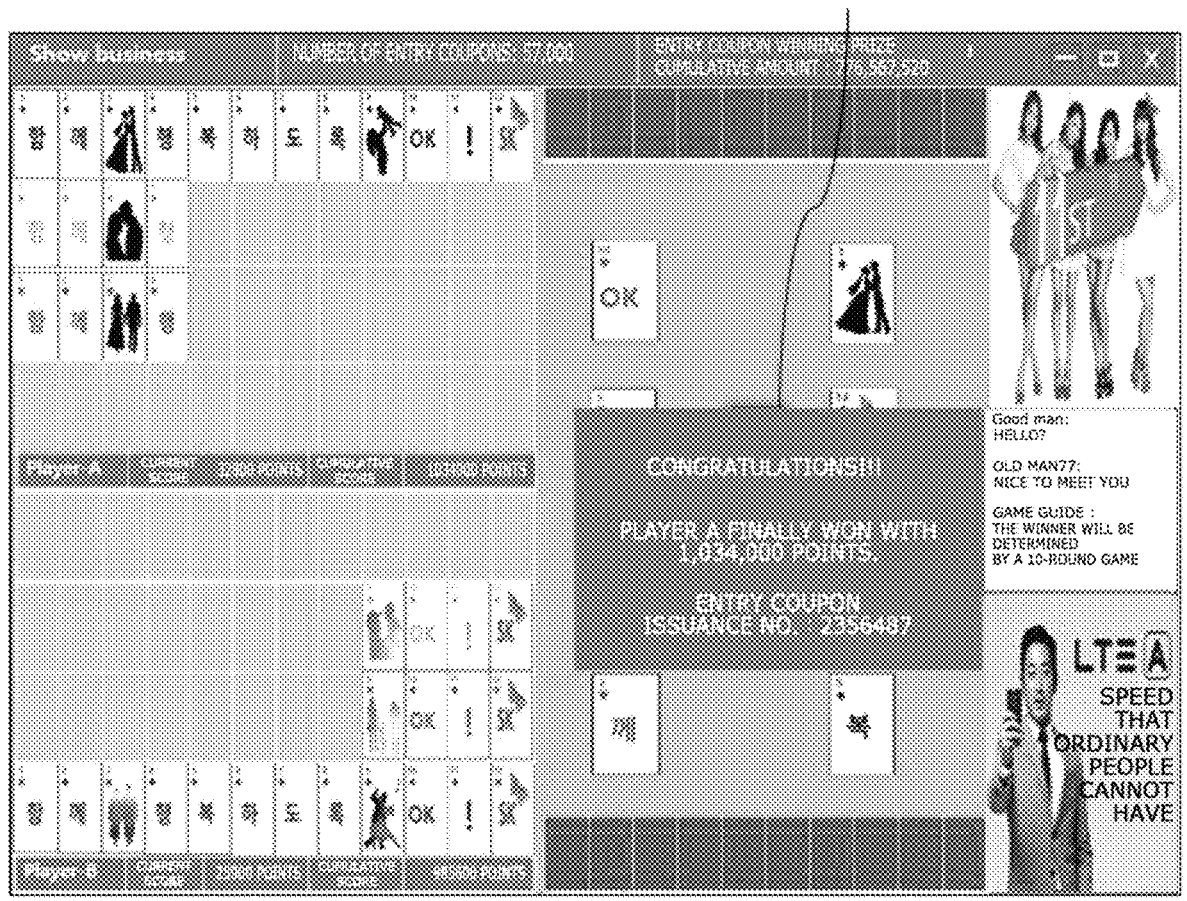

When the overall game is finished at step S1106, the game server 100 compares cumulative scores at step S1108 and determines a winner at step S1110, as shown in FIG. 19, and issues an entry coupon and provides the entry coupon to the terminal of the winner at step S1112, as shown in FIG. 22.

Next, whenever the number of issued entry coupons exceeds a predetermined number at the time when the overall game is finished or at a set time or date (10 o'clock on every Sunday, or 10th, 20th, or 30th day of each month, or the like), the game server 100 randomly draws an entry coupon at step S1114, announces a prize winner through a notice on a homepage at step S1116, and pays prize money to the account of the prize winner at step S1118.

In this case, the prize money is prepared by accumulating a certain percentage of the advertising sales generated by playing the game using the cards in which the advertisement is converted into the story.

FIG. 23 illustrates entry coupons issued when a player A completes an advertising story or wins a game, and winding results.

The invention claimed is:

1. A system for advertising through a playing card game, in which a plurality of player terminals connects with a game server over a network and plays a game using a deck of playing cards (hereinafter "cards") created by converting an advertisement into a story, wherein:
   the game server outputs a game progress screen including a card arrangement board to each of the plurality of player terminals, and deals out the cards as a plurality of player cards (cards held by players), table cards (table face-up cards), and table standby cards (table face-down cards);
   when a player proceeds with a game and acquires a table face-up card, the game server moves and arranges the acquired card to and on a card arrangement board of the corresponding player and awards a score according to a combination of cards; and when the combination of the cards is changed during the game, the game server automatically changes the score and provides the changed score to the player terminal; and
   the game server outputs a storytelling advertisement contained in playing cards when each player arranges the playing cards on his or her card arrangement board, and outputs a product advertisement associated with a corresponding storytelling advertisement onto a corresponding player-based product advertisement window of the game progress screen,
   wherein the game server configures the card arrangement board so that each column includes 4 spaces, and awards a vertical score in such a manner that 1 point per card is awarded when no columns are completed, 2 points per card are awarded when one column is completed, and 3 points per card are awarded when two columns are successively completed,
   wherein the game server configures the card arrangement board so that each row includes a plurality of spaces to complete an advertising story, and awards scores whenever a row is completed in such a manner that a score twice the vertical score is awarded when one overall row is completed, and a score four times the vertical score is awarded when two overall rows are completed regardless of successive completion,
   wherein the game server issues an entry coupon to a corresponding player terminal whenever a player completes one overall row of the card arrangement board, and issues an entry coupon to a terminal of a player determined to be a winner.

2. The system of claim 1, wherein the plurality of player terminals is first and second player terminals, and the plurality of player cards is first and second player cards.

3. The system of claim 1, wherein the card arrangement board is configured to be arranged in a same configuration as the cards used in the game, is provided to each player, and allows cards acquired by each player during a game process to be arranged thereon.

4. The system of claim 3, wherein the card arrangement board serves as criteria for allowing different scores to be awarded according to a combination of arranged cards, and clearly reveals the advertising story contained in the cards.

5. The system of claim 1, wherein the card arrangement board serves as criteria for allowing different scores to be awarded according to a combination of arranged cards, and clearly reveals the advertising story contained in the cards.

6. The system of claim 1, wherein the game progress screen is configured such that player cards (cards held by players), table cards (table face-up cards), and table standby cards (table face-down cards) are located on a center portion thereof, card arrangement boards for respective players are located on a left side thereof, and product advertisement windows for respective players and a chat window are located on a right side thereof.

7. The system of claim 1, wherein the playing cards are marked with numbers in order to indicate differences in sequence, four cards are allocated to each of the numbers, and the four cards are marked with patterns in order to indicate differences among them.

8. The system of claim 7, wherein numbers and patterns are marked on upper or lower portions of first sides of the cards in small sizes, and characters or images adapted to convert an advertisement into a story are marked on center portions of the cards in sizes larger than those of the numbers and the patterns.

9. The system of claim 1, wherein the game server issues an entry coupon to a player who completes an advertising story using acquired cards on the card arrangement board or a player who has more cumulative scores at an end of the game, and pays prize money through drawing.

10. A method for advertising through a playing card game, in which first and second player terminals connect with a game server over a network and play a game using a deck of playing cards (hereinafter "cards") created by converting an advertisement into a story, the method comprising:
   (a) outputting, by a game server, a game progress screen including a card arrangement board to each of first and second player terminals;
   (b) dealing out, by the game server, the cards as cards held by first and second players, table face-up cards, and table face-down cards and providing, by the game server, the cards held by first and second players to first and second player terminals;
   (c) when any one of the first and second player terminals proceeds with a game and acquires a table face-up card, moving and arranging the acquired card to and on a card arrangement board of the corresponding player terminal;
   (d) awarding a score according to a combination of cards arranged on the card arrangement board;

(e) when the combination of the cards is changed, adding or deducting a score to or from a current score;

(f) awarding a score for one round game to each of the first and second player terminals by repeating steps (c) to (e) until the player cards are exhausted;

(g) accumulating scores for an overall game by repeating steps (a) to (f) up to a final round game; and (h) determining a player having the larger cumulative score to be a winner;

wherein the game server outputs a storytelling advertisement contained in playing cards when each player arranges the playing cards on his or her card arrangement board; and wherein the game server outputs a product advertisement associated with a corresponding storytelling advertisement onto a corresponding player-based product advertisement window of the game progress screen, wherein the game server configures the card arrangement board so that each column includes 4 spaces, and awards a vertical score in such a manner that 1 point per card is awarded when no columns are completed, 2 points per card are awarded when one column is completed, and 3 points per card are awarded when two columns are successively completed, wherein the game server configures the card arrangement board so that each row includes a plurality of spaces to complete an advertising story, and awards scores whenever a row is completed in such a manner that a score twice the vertical score is awarded when one overall row is completed, and a score four times the vertical score is awarded when two overall rows are completed regardless of successive completion, wherein the game server issues an entry coupon to a corresponding player terminal whenever a player completes one overall row of the card arrangement board, and issues an entry coupon to a terminal of a player determined to be a winner.

11. The method of claim 10, wherein the game server configures the card arrangement board so that the card arrangement board is arranged in a same configuration as the cards used in the game, provides the card arrangement board to each player, and allows cards acquired by each player during a game process to be arranged thereon.

12. The method of claim 10, wherein the game server locates player cards (cards held by players, table cards (table face-up cards) and table standby cards (table face-down cards) on a center portion of the game progress screen, locates card arrangement boards for respective players on a left side thereof, and locates product advertisement windows for respective players and a chat window on a right side thereof.

13. The method of claim 10, wherein the game server draws one from entry coupons and pays prize money to a prize winner, and the prize money is prepared by accumulating a predetermined percentage of advertisement sales generated during the game.

14. The method of claim 10, wherein the game server invests the player with a right to take one card from the cards arranged on an opponent player card arrangement board when the player performs a chok, a sseul, a ttadak, a hand-poktan, or a table-poktan during the game, and moves and arranges one selected specific card on the player card arrangement board of the corresponding player when the player selects (clicks) the specific card on a corresponding player terminal.

* * * * *